(12) United States Patent
Seiler

(10) Patent No.: US 11,244,492 B2
(45) Date of Patent: Feb. 8, 2022

(54) PARALLEL TEXTURE SAMPLING

(71) Applicant: Facebook Technologies, LLC, Menlo Park, CA (US)

(72) Inventor: Larry Seiler, Redmond, WA (US)

(73) Assignee: Facebook Technologies, LLC., Menlo Park, CA (US)

(*) Notice: Subject to any disclaimer, the term of this patent is extended or adjusted under 35 U.S.C. 154(b) by 98 days.

(21) Appl. No.: 16/591,520

(22) Filed: Oct. 2, 2019

(65) Prior Publication Data

US 2020/0143580 A1 May 7, 2020

Related U.S. Application Data

(60) Provisional application No. 62/755,281, filed on Nov. 2, 2018.

(51) Int. Cl.
*G06T 15/04* (2011.01)
*G06T 15/08* (2011.01)

(52) U.S. Cl.
CPC .............. *G06T 15/04* (2013.01); *G06T 15/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,987,567 A * | 11/1999 | Rivard | ................ | G06F 12/0875 345/501 |
| 6,304,268 B1 | 10/2001 | Iourcha | | |
| 6,573,902 B1 * | 6/2003 | Liao | ........................ | G06T 11/40 345/552 |
| 6,924,811 B1 * | 8/2005 | Minkin | ..................... | G06T 1/60 345/552 |
| 7,050,063 B1 | 5/2006 | Mantor | | |
| 10,255,655 B1 * | 4/2019 | Bergland | .................. | G06T 1/60 |
| 2002/0158880 A1 * | 10/2002 | Williams | ................ | G06T 15/04 345/582 |
| 2003/0169265 A1 | 9/2003 | Emberling | | |
| 2006/0164429 A1 * | 7/2006 | Mantor | ................... | G06T 15/04 345/582 |
| 2015/0199825 A1 | 7/2015 | Capens | | |
| 2016/0267006 A1 * | 9/2016 | Garanzha | ............ | G06F 12/0875 |
| 2016/0364900 A1 * | 12/2016 | Seiler | .................... | G06T 11/001 |
| 2016/0379333 A1 * | 12/2016 | Krutsch | .................. | G06F 11/00 345/506 |

(Continued)

OTHER PUBLICATIONS

International Search Report and Written Opinion for International Application No. PCT/US2019/057792, dated Feb. 20, 2020.

*Primary Examiner* — Andrew G Yang
(74) *Attorney, Agent, or Firm* — Baker Botts L.L.P.

(57) ABSTRACT

In one embodiment, a computing system may receive a number of texels organized into a texel array including a number of sub-arrays. The system may determine a number of texel subsets with the texels in each subset having a same position within their respective sub-arrays. The system may store the texel subsets into a number of buffer blocks, respectively, with each buffer block storing one texel subset. The system may retrieve a sampling texel array from the buffer blocks for parallelly determining pixel values of a number of sampling points. Each texel of the sampling texel array may be retrieved from a different buffer block.

20 Claims, 26 Drawing Sheets

(56) References Cited

U.S. PATENT DOCUMENTS

2016/0379403 A1* 12/2016 Seiler ................ G06T 3/60
                                                    345/582
2018/0129419 A1* 5/2018 Flordal ............ G06F 3/0683

* cited by examiner

PARALLEL TEXTURE SAMPLING

PRIORITY

This application claims the benefit, under 35 U.S.C. § 119(e), of U.S. Provisional Patent Application No. 62/755,281, filed 2 Nov. 2018, which is incorporated herein by reference.

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to a method of rendering artificial reality objects using pre-warped surfaces as the rendering primitives, and parallelly retrieving all the texels that are needed to determine the properties (e.g., colors or distance fields) of a set of pixel samples (e.g., a 2×2 set of pixels) within a tile (e.g., a collection of pixels, such as 16×16 pixels, defined by its four corners) in one operation. The system may generate pre-warped surfaces on one or more CPUs/GPUs associated with a computing system (e.g., a body wearable computing system, such as a mobile phone, or a laptop, desktop, etc.). The pre-warped surfaces may be generated based on the rendering results of the CPU(s)/GPU(s), such as a 2D image that visually take into account the 3D contour of the underlying object. The pre-warped surfaces may be generated with particular shape, size, orientation based on a viewpoint (e.g., view distance, view angle) of a viewer. The 2D image may be stored as the texture data of the surface. The surface may be considered as a flat planar canvas for the 2D texture and is positioned in 3D view space facing the viewer (e.g., with a normal vector substantially pointing towards the viewer). As a result, the pre-warped texture data of the surface may be represented by a single mipmap level instead of multiple texture mipmap levels.

A headset system may receive the pre-warped surfaces from the body wearable computing system and render the surfaces on a head mounted display by transforming the pre-warped surfaces. Visibility of pre-warped surfaces may be tested by projecting rays from a viewer's screen. In particular embodiments, the rays may be cast from a number of tiles (e.g., an aligned block of 16×16 pixels), each of which may be defined by its four corner positions in screen space. Once it is determined that a particular surface is visible from a tile, colors for pixels within the tile may be sampled from the texture of the surface. In particular embodiments, pixel sampling may be performed concurrently for four aligned 2×2 pixels. The system may restrict minification by zooming out operations to be within a two-time range. With this constraint, the 2×2 sampling points may always fall within a 4×4 texels region. In particular embodiments, the system may use a multi-level memory architecture including 16 independent texel buffer blocks for texel buffer. The system may use a pre-determined texel storage pattern to store 4×4 texels regions in the 16 independent quad buffer blocks that can be addressed separately and can be readout parallelly (e.g., in one operation). Therefore, the system may access the 4×4 texels region in one read operation and parallelly sample all the texels that are needed to determine the four pixels values (rather than sequentially access four quads). Since the pre-warped surfaces are generated based on one texture mipmap level, the headset system may only need to access single texture mipmap and use bilinear interpolation instead of trilinear interpolation, which would require reading another set of texel data from a different mipmap level, to determine the pixels values.

In an embodiment, a method may comprise, by a computing system:
  receiving a plurality of texels organized into a texel array comprising a plurality of sub-arrays;
  determining a plurality of texel subsets, wherein the texels in each subset have a same position within their respective sub-arrays;
  storing the plurality of texel subsets into a plurality of buffer blocks, respectively, wherein each buffer block stores one texel subset of the plurality of texel subsets; and
  retrieving a sampling texel array from the plurality of buffer blocks for parallelly determining pixel values of a plurality of sampling points, wherein each texel of the sampling texel array is retrieved from a different buffer block of the plurality of buffer blocks.

The plurality of sub-arrays may form a repeated pattern within the texel array.

Each of the plurality of buffer blocks may be addressed separately and accessed parallelly.

The plurality of buffer blocks may be grouped into a plurality of groups, and each texel used for determining a pixel value of a sampling point may be retrieved from a different group of the plurality of groups.

In one embodiment, the plurality of texel subsets may be determined by:
  determining a reference texel having a first coordinate (u, v) indicating a position of the reference texel within the texel array;
  determining a plurality of intermediate texel groups comprising texels having least significant bits of binary representations of first coordinates (u, v) equal to (0, 0), (1, 0), (0, 1), and (1, 1), respectively;
  determining a second coordinate (x, y) for each texel of each intermediate texel group; and
  determining the plurality of texel subsets each comprising texels having least significant bits of binary representations of second coordinates (x, y) equal to (0, 0), (1, 0), (0, 1), and (1, 1) with respect to a corresponding intermediate texel group.

The plurality of texel subsets may comprise 16 texel subsets, and the plurality of buffer blocks may comprise 16 buffer blocks.

The 16 texel subsets may be organized into four texel groups. The plurality of sampling points may comprise four sampling points, and the four texel groups may be used for parallelly determining the pixels values of the four sampling points, respectively.

Each pixel value may be determined based on a 2×2 texel sub-array of the sampling texel array, and each texel of the 2×2 texel sub-array may be selected from one of the four texel groups.

The plurality of sampling points may be associated with an intersection area of a display region to a two-dimensional representation of a portion of a scene.

The two-dimensional representation may comprise three-dimensional information of the portion of the scene, and the two-dimensional representation of the portion of the scene may be visible in the display region.

The two-dimensional representation of the portion of the scene may be represented with a single texture resolution, and the texel array may comprise texels having the single texture resolution.

The sampling texel array may be associated with an aligned texel region or an unaligned texel region.

In one embodiment, one or more computer-readable non-transitory storage media may embody software that is operable when executed to:
  receive a plurality of texels organized into a texel array comprising a plurality of sub-arrays;
  determine a plurality of texel subsets, wherein the texels in each subset have a same position within their respective sub-arrays;
  store the plurality of texel subsets into a plurality of buffer blocks, respectively, wherein each buffer block stores one texel subset of the plurality of texel subsets; and
  retrieve a sampling texel array from the plurality of buffer blocks for parallelly determining pixel values of a plurality of sampling points, wherein each texel of the sampling texel array is retrieved from a different buffer block of the plurality of buffer blocks.

The plurality of sub-arrays may form a repeated pattern within the texel array.

Each of the plurality of buffer blocks is addressed separately and accessed parallelly.

The plurality of buffer blocks may be grouped into a plurality of groups, and each texel used for determining a pixel value of a sampling point may be retrieved from a different group of the plurality of groups.

In one embodiment, a system may comprise: one or more processors; and one or more computer-readable non-transitory storage media coupled to one or more of the processors and comprising instructions operable when executed by one or more of the processors to cause the system to:
  receive a plurality of texels organized into a texel array comprising a plurality of sub-arrays;
  determine a plurality of texel subsets, wherein the texels in each subset have a same position within their respective sub-arrays;
  store the plurality of texel subsets into a plurality of buffer blocks, respectively, wherein each buffer block stores one texel subset of the plurality of texel subsets; and
  retrieve a sampling texel array from the plurality of buffer blocks for parallelly determining pixel values of a plurality of sampling points, wherein each texel of the sampling texel array is retrieved from a different buffer block of the plurality of buffer blocks.

The plurality of sub-arrays may form a repeated pattern within the texel array.

Each of the plurality of buffer blocks may be addressed separately and accessed parallelly.

The plurality of buffer blocks may be grouped into a plurality of groups, and each texel used for determining a pixel value of a sampling point may be retrieved from a different group of the plurality of groups.

In an embodiment, one or more computer-readable non-transitory storage media may embody software that is operable when executed to perform a method according to or within any of the above mentioned embodiments.

In an embodiment, a system may comprise: one or more processors; and at least one memory coupled to the processors and comprising instructions executable by the processors, the processors operable when executing the instructions to perform a method according to or within any of the above mentioned embodiments.

In an embodiment, a computer program product, preferably comprising a computer-readable non-transitory storage media, may be operable when executed on a data processing system to perform a method according to or within any of the above mentioned embodiments The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
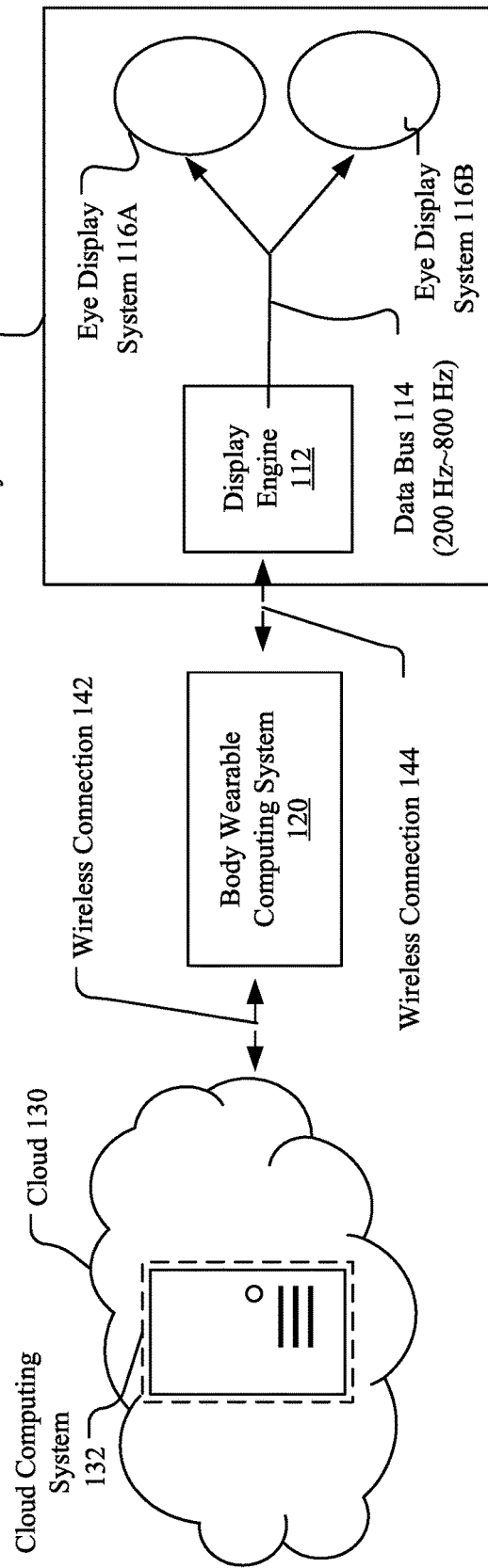
FIG. 1A illustrates an example artificial reality system.

Traditional graphics rendering systems may need to perform separate read operations to obtain the necessary texel data from a texture to determine the color (for images) or distance field (for labels, such as fonts, characters, glyphs, etc.) for a single pixel. During a sampling process, traditional rendering pipelines implemented on traditional GPUs access texel buffer memory in quads when performing bilinear interpolation to determine the pixel value (e.g., color/distance field). For example, traditional GPUs may need to perform four separate read operations to retrieve the four closest texels, relative to the sample location, that are needed to perform filtering (e.g., via bilinear interpolation). Such memory-access operations are slow and consume more power. In addition, if multiple pixel samples are being filtered concurrently, different sampling locations may require texels from different texture mipmap levels, further adding to memory-access time. For example, if a virtual box is drastically slanted relative to the viewer, the portion of the box that is closer to the viewer may use a high-resolution mipmap texture than the portion of the box that is farer away from the viewer. Similarly, if the viewer zooms out from the box, more texels may need to be retrieved or the system may need to switch to a coarser mipmap level. Such operations, especially when performed in large volume, significantly adds to the overall rendering time, power consumption, and complexity of the system.

The problems described above may be largely eliminated by particular embodiments of a display engine that is designed to process or adjust pre-warped surfaces. These surfaces may be the primitives on which the display engine operates, rather than 3D model polygons from which traditional computer graphics are rendered. A "surface" may comprise 2D texture data, made up of texels, and 3D position data (e.g., distance, angle, or/and coordinates as specified in the viewer's view-space coordinates). In particular embodiments, a surface may be represented as a flat, planar canvas, placed in a viewer's view space, on which the texture is mapped. Visibility of a surface may be computed using the 3D position data of the surface, and color or distance field determination for each pixel may be sampled from the texture data of the surface. The texture of a surface may be generated based on the 2D image rendered by a GPU (e.g., from a 3D model defined by polygons). As such, even if a surface appears to show a 3D object, the surface is, in fact, a flat surface. A surface, therefore, can be considered as having been pre-warped based on the viewer's viewpoint when the surface is generated. Moreover, the normal vector of the surface may substantially point towards the viewer, even if the viewer moved slightly since the time when the surface was generated (e.g., the viewer is unlikely to have moved significantly between frames or ¹⁄₆₀ of a second). Since a surface is pre-warped and facing the viewer, when the surface is being processed by the display engine to make inter-frame adjustments, the surface can be sampled using a single texture mipmap level (e.g., instead of multiple texture mipmap levels). In addition, particular embodiments of the system may restrict minification caused by zoom-out operations to be within a two-time range, which allows the four sampling points to always fall within a 4×4 texel region. Particular embodiments of the system may take advantage of this feature and configure a texel storage pattern in the texel buffer memory (e.g., quad buffer blocks including texel buffer blocks) to allow the 4×4 texel region to be stored in a manner so that it can be read out in one read operation. Particular embodiments of the system may use a memory structure including a pre-determined number of memory blocks, which can be accessed parallelly with reduced multiplexing and bandwidth requirements.

Particular embodiments of the system provide faster and fewer memory reading to retrieve the texels that are need for determining pixel values, and reduce power consumption and operation logic that are needed to retrieve texels from texel buffer memory (e.g., quad buffer blocks including texel buffer blocks). Particular embodiments of the system reduce the amount of computation by the headset system for adjusting or transforming (e.g., conceptually, adjustments in position, orientation, and/or scale) a pre-warped surface to accommodate a viewer's changing viewpoints between frames. Particular embodiments of the system reduce the amount of computation and power consumption that are needed for reading the texels needed for filtering multiple pixel samples (e.g., 2×2 pixels), since the system confines any such group of samples to fall within a 4×4 texel region. Particular embodiments of the system provide a texel buffer hardware structure and texel data storage pattern that reduce the multiplexing operations on the headset system and reduce the bandwidth usage on data bus when accessing the texel buffer memory (e.g., quad buffer blocks including texel buffer blocks).

FIG. 1A illustrates an example artificial reality system 100. In particular embodiments, the artificial reality system 100 may include a headset system 110, a body wearable computing system 120, a cloud computing system 132 in a cloud 130, etc. In particular embodiments, the headset system 110 may include a display engine 112 which is connected to two eye display systems 116A and 116B through a data bus 114. The headset system 110 may be a system including a head-mounted display (HMD) which may be mounted on a user's head to provide artificial reality to the user. The headset system 110 may have limited amount of power available in its power sources (e.g., batteries). The display engine 112 may provide display data to the eye display systems 116A and 116B though the data bus 114 with relative high data rates (e.g., 200 Hz~800 Hz). As will be discussed later, the display engine 112 may include one or more controller blocks, texel memories, transform blocks, pixel blocks, etc. The texels stored in the texel memories may be accessed by pixel blocks and may be provided to the eye display systems 116A and 116B for display.

Figure 1B:
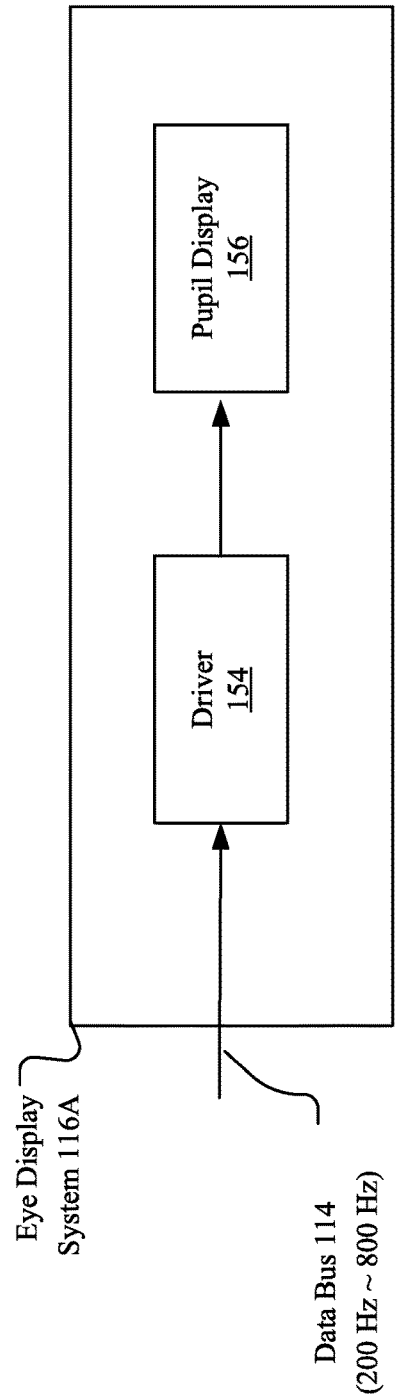
FIG. 1B illustrates an example eye display system of the headset system.

In particular embodiments, the body wearable computing system 120 may be worn on the body of a user. In particular embodiments, the body wearable computing system 120 may be a computing system (e.g., a laptop, a desktop, a mobile computing system) that is not worn on a user body. The body wearable computing system 120 may include one or more GPUs, one or more smart video decoders, memories, processors, and other modules. The body wearable computing system 120 may have more computational resources than the display engine 112 but may still have limited amount power in its power sources (e.g., batteries). The body wearable computing system 120 may be coupled with the headset system 110 through a wireless connection 144. The cloud computing system 132 may be high performance computers (e.g., servers) and may communicate with the body wearable computing system 120 through a wireless connection 142. FIG. 1B illustrates an example eye display system (e.g., 116A or 116B) of the headset system 110. In particular embodiments, the eye display system 116A may include a driver 154, a pupil display 156, etc. The display engine 112 may provide display data to the pupil display 156 the data bus 114 and the driver 154 at high data rates (e.g., 200 Hz~800 Hz).

Figure 2:
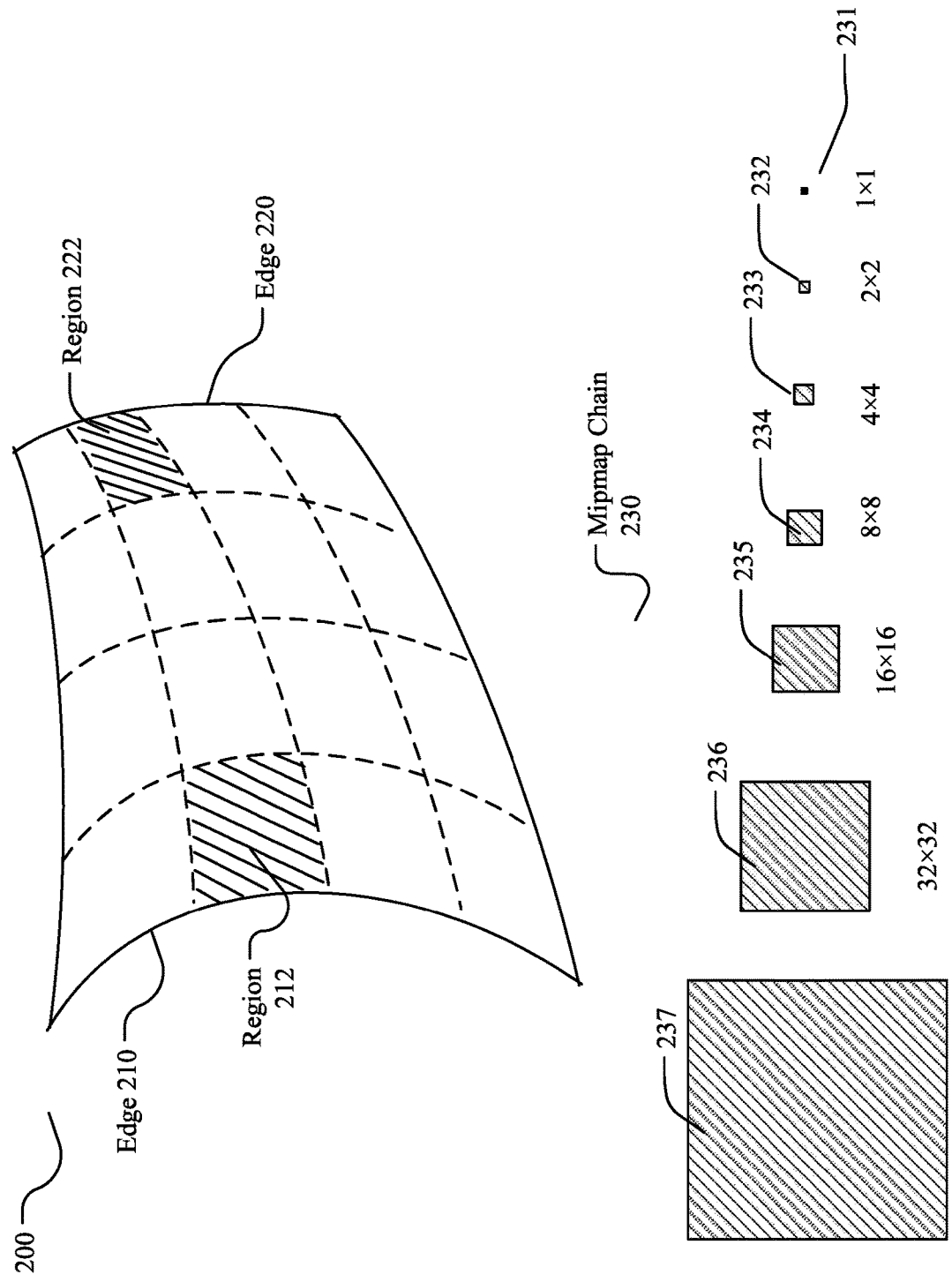
FIG. 2 illustrates an example 3D object.

In traditional graphics-rendering systems, depending on how a 3D object(s) is oriented relative to a viewer, certain regions of the 3D objects would be closer to the viewer than others. The distance discrepancy may lead to pixel sampling locations in different regions to require different mipmap levels for texture sampling. As an example, FIG. 2 illustrates an example 3D object 200. The object 200 may be oriented in a slanted orientation relative to the viewer, with edge 210 of the object 200 being relatively closer to the viewer than edge 220. As a result, sampling the color of a pixel that falls in the region 212 on the edge 210 may require a finer texture mipmap level relative to the coarser mipmap level that may be used to sample a pixel that falls in region 222 on the edge 220. For example, if the GPUs has access to multiple texture levels 231, 232, 233, 234, 235, 236, 237 in a mipmap chain 230, the GPU may use mipmap level 237 for pixels falling within region 212 and mipmap level 236 for pixels falling within region 222.

In addition, mipmap levels may need to change due to minification caused by zoom-out operations. In general, if a zoom-out operation results in more than two-time zoom out on an object, the mipmap used for sampling may need to change in order to render a new scene. For example, if the viewer were to zoom out, resulting in the size of each texel in those mipmap levels 237, 236 to become smaller relative to the pixel sample size, the GPU may change the mipmap levels used. For example, after zooming out, the GPU may use mipmap level 236 for pixel samples falling in region 212 and mipmap level 235 for pixel samples falling in region 222.

Unfortunately, reading texture data out of texel buffer memory takes time and power. As such, the aforementioned scenarios where mipmap switching can be costly and unsuitable in applications where frames are expected to be output at a very high rate, such as 200-800 frames per second. In particular embodiments where a display engine resides on an AR/VR headset system, computational resources and available power (e.g., powered by one or more batteries) may be especially limited. These limitations on computational resources and available power may become prohibitive for a headset system to meet the demands of the application (e.g., rendering AR/VR scenes that are responsive to user movements).

Particular embodiments of the system address the aforementioned problems by generating (e.g., at 60 hertz frame rate) pre-warped surfaces on the GPUs of body wearable computing system and allow the headset system to post-warp or re-sample the pre-warped surfaces (e.g., at 200 or more hertz) to adjust for changes in the viewer's perspective between frames. In addition to generating pre-warped surfaces, particular embodiments may further limit zoom-out operations to no more than 2× zoom out. As will be explained in further detail below, doing so would ensure that the texels needed for sampling four 2×2 pixels are confined to a 4×4 texel region. This enables the display engine to configure how texels are written and read so that a 4×4 texel region can be access using a single read operation.

Figure 3:
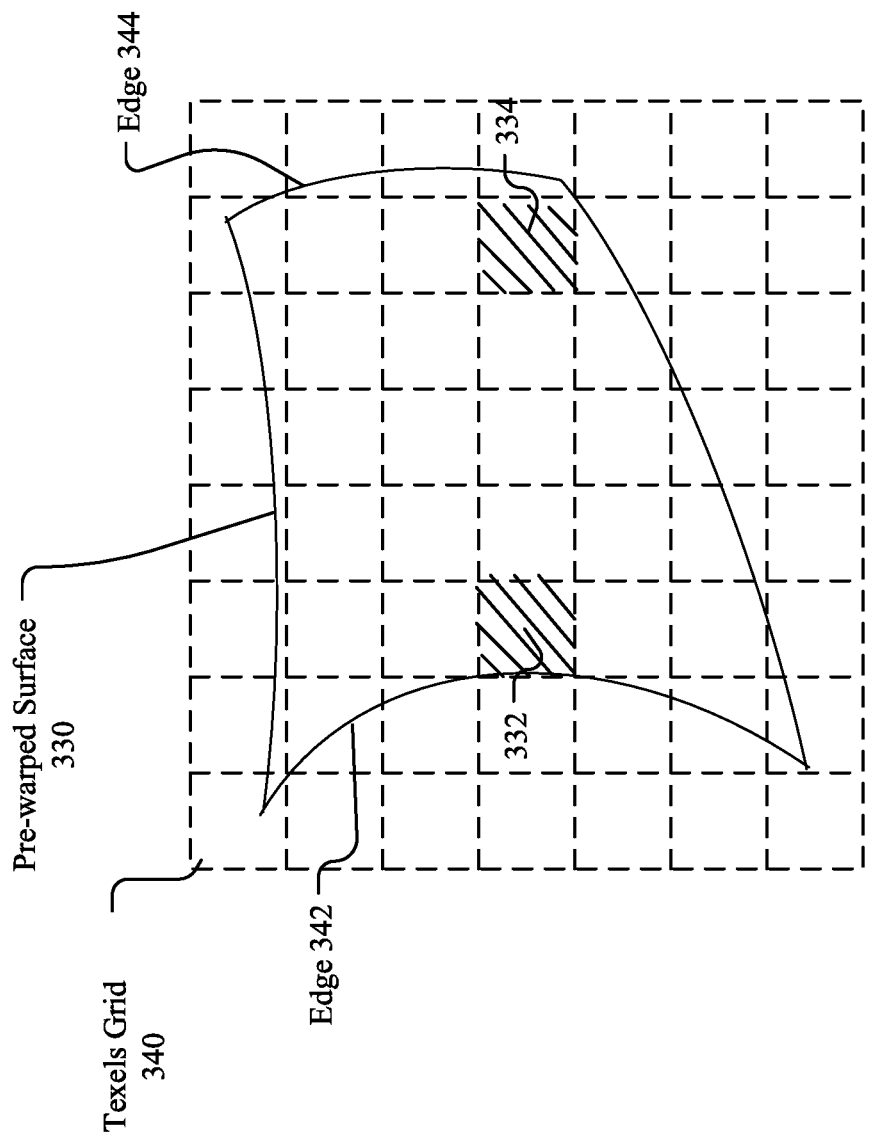
FIG. 3 illustrates an example pre-warped surface generated on a body wearable computing system.

FIG. 3 illustrates an example pre-warped surface 330 generated on a body wearable computing system. In particular embodiments, the body wearable computing system may include one or more GPUs or/and smart video decoders. In particular embodiments, the pre-warped surfaces may be generated one or more GPUs on the body wearable computing system. In particular embodiments, the pre-warped surfaces may be generated by one or more video decoders on the body wearable computing system. For example, the GPUs on the body wearable computing system may render a 2D view of the 3D object 200 shown in FIG. 2. The 2D object 200 may be defined using a large number of polygons or triangles (e.g., hundreds or thousands of polygons), and the body wearable computing system may render the 2D view using a traditional graphics-rendering pipeline (e.g., using ray tracing and shading). Although this rendering process could be very expensive computationally, the body wearable computing system may have more computational resources (e.g., more powerful processors, more memory space) and more available power (e.g., larger battery capacity, direct plugin to a power outlet, etc.) than the headset system. As such, the 2D view of the 3D object 200 may be rendered at the rate of, for example, 30-60 hertz.

In particular embodiments, the 2D view of the 3D object 200 may be used to generate the pre-warped surface 330. Although the pre-warped surface 330 is represented in 2D, it may appear 3D from the viewpoint of the viewer when the 2D view of rendered. For example, the edge 342 of the surface 330 may appear closer to the viewpoint, and the edge 344 may appear to be farer from the viewpoint. Despite its 3D appearance, the texture of the pre-warped surface 330 is 2D, as if the surface is a flat canvas on which the 2D image is mapped. The pre-warped warped surface 330 may have a defined position within 3D view space relative to a viewpoint. Different regions of the pre-warped surface 330 may be substantially equal distance from the viewpoint. For example, the regions corresponding to texels 332 and 334 may be substantially equal distance from the viewpoint in 3D view space, yet the corresponding regions 212 and 222 on the 3D model 200 are different distances away from the viewpoint when the 2D view of the 3D object 200 was rendered.

In particular embodiments, the 2D appearance of the pre-warped surface 330 may be stored as a texture with a uniform texel grid 340. Unlike the corresponding 3D model 200, the pre-warped surface 330 is substantially equal distance from the viewpoint, even though the relative depth of regions such as 332 and 334 may appear to be different. As such, any pixel sampling on the pre-warped surface 330 may be performed using the same mipmap level texture, rather than different mipmap levels for different portions of the surface. For example, although the edge 342 may appear closer to the viewer than the edge 344, the texels corresponding to regions 332 and 334 may correspond to the same texture level or texture resolution.

The headset system may receive the pre-warped surface from the body wearable computing system through a wireless or wired communication connection. In particular embodiments, the headset system may receive the pre-warped surface at the start of a frame. Between then and the next frame (e.g., in ⅟60 second intervals), the headset system may warp or re-sample the pre-warped surface based on the current head position or eye gaze of the user (as determined based on the inertial measurement unit and/or eye tracking device of the headset) at a much higher frame rate (e.g., 200 or more hertz). In this manner, the headset system may avoid the expensive computation that is needed in generating the pre-warped surfaces from the 3D model defined using polygons, and instead be tasked with providing dynamic, real-time updates to the pre-warped surface, which may be significantly fewer in number than the polygons.

Figure 4:
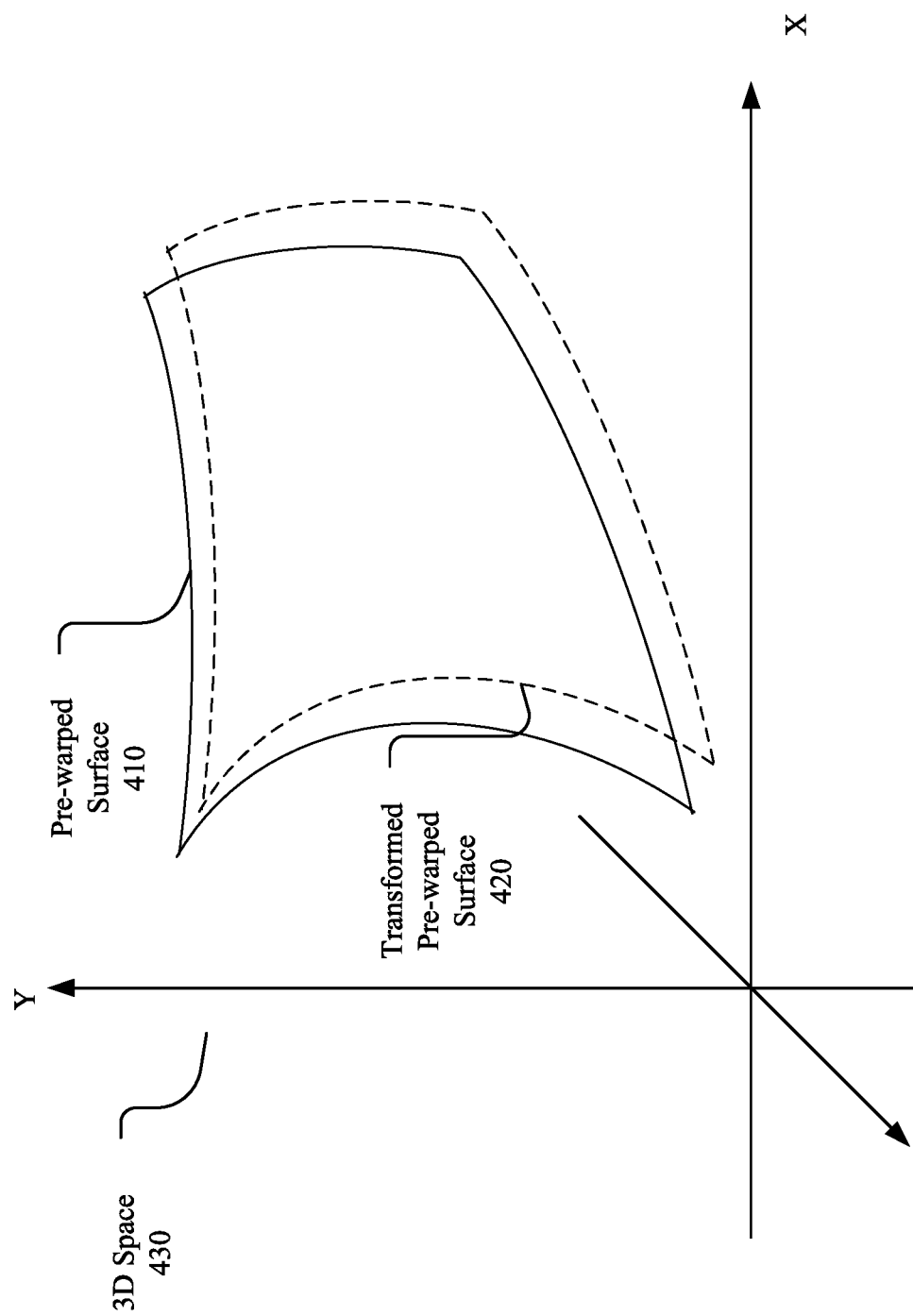
FIG. 4 illustrates an example pre-warped surface which appears transformed by the headset system for rendering on eye display systems.

FIG. 4 illustrates an example pre-warped surface 410 which appears transformed by the headset system for rendering on eye display systems. In particular embodiments, the headset system may receive pre-warped surfaces from the body wearable computing system. The per-warped surface may be generated based on the rendering results on the GPUs associated with the body wearable computing system and may visually take into account the 3D contour of the underlying object. In particular embodiments, the surface may include texture data as well as position data within the viewer's view space. Based on changes in the viewer's current perspective (e.g., head orientation and/or eye gaze), the display engine of the headset system may perform visibility tests (e.g., using ray casting) from the updated viewpoint of the viewer. For example, the display engine may cast rays from each tile in screen space, positioned and oriented in accordance with the viewer's current perspective, and see if the rays intersect any surfaces in view space. Based on the visibility determination, the display engine may then re-sample the appropriate color information for each pixel using the texture data of the surfaces that intersect the projected rays. The result of this post-warping process may be an updated 2D frame after the body computing system rendered the initial 2D frame (which was used to generate the pre-warped surface). The updated 2D frame may appear as if the headset system generated a transformed pre-warped surface 420 by moving and/or warping the initial pre-warped surface 410 along one or more dimensions in the 3D space 430. As another example, the headset system may rotate the pre-warped surface 410 along one or more axis in the 3D space 430. As another example, the headset system may increase or reduce the size of the pre-warped surface 410 for zoom in or out operations. As another example, the headset system may combine one or more transformations or adjustments as described above to transform or adjust the received pre-warped surface into a new surface (e.g., 420) for rendering on eye display systems.

In particular embodiments, the headset system may transform or adjust the received pre-warped surfaces according to one or more conditions of the viewers. In particular embodiment, the headset system may transform or adjust the received pre-warped surfaces according to one or more conditions which cause the pre-warped surface to change its position (e.g., distance, orientation, angle) with respect to the viewer in relative high speed but within relative small ranges. For example, the headset system may adjust the orientation or position of the pre-warped surface 410 based on a viewpoint change (e.g., head motion, eye motion) of the viewer. As another example, the headset system may adjust the size, orientation, or/and position of the pre-warped surface 410 based on a zooming operation (e.g., zoom in or out) of the viewer. In particular embodiments, the conditions of the viewers (e.g., viewpoint change, view distance change, user operations) may be determined based on one or more sensors or sensing systems associated with the artificial reality system, for example, accelerometers, vergence tracking systems, eye tracking systems, head motion sensors, body motion sensors, controllers, etc. In particular embodiments, the headset system may transform or adjust the received pre-warped surfaces according to one or more conditions including, for example, but not limited to, a view point, a view distance, a view angle, a moving speed, a moving direction, an acceleration metric, a head motion, an eye motion, an head posture, an eye status, an user zooming operation, a gazing point, a gazing distance, a vergence distance, an user input, a controller status, etc.

In particular embodiments, the system may limit the minification effect of zoom out operations to be within a two-time zoom out range. The two-time zoom-out limitation may ensure that the changes in texel size relative to sample pixel size, as caused by the user's zooming operations, will be within an acceptable range for using the current texture mipmap level. Furthermore, as will be discussed later, the two-time zoom-out constraint may allow the four sampling points associated with one tile to fall within an aligned or unaligned 4×4 texel region, and therefore allow the system to parallelly retrieve all the texels that are needed to determine the colors or distance fields of the sampling points with higher speed and better computational efficiency. In addition, by bounding the number of texels that are needed for a block of 2×2 sampling positions, this limitation simplifies the logic of the display engine while allowing the headset system to provide updated frames faster with improved efficiency.

Figure 5:
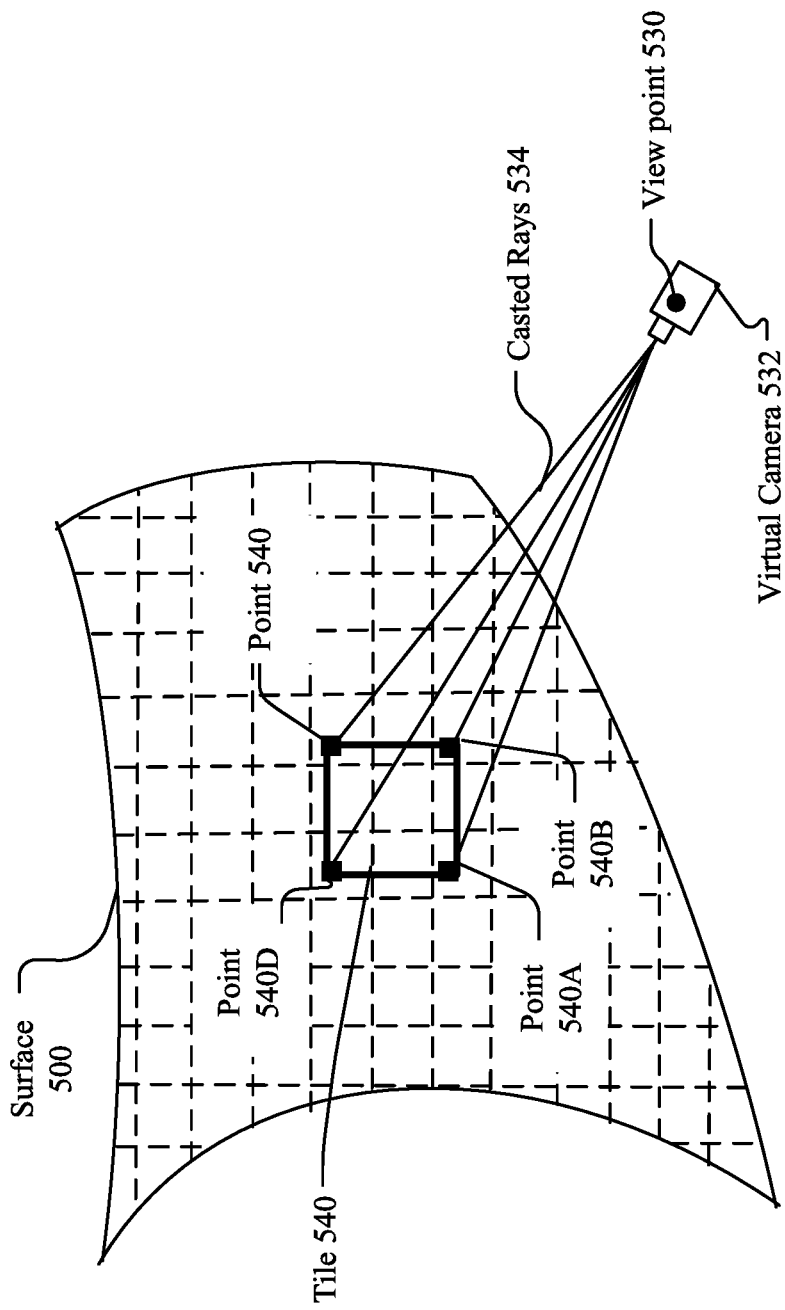
FIG. 5 illustrates an example pre-warped surface that is visible through an example tile.

FIG. 5 illustrates an example pre-warped surface 500 that is visible through an example tile 540. In particular embodiments, the system may use a ray casting algorithm to determine whether a pre-warped surface 500 is visible through a region on a screen. In particular embodiments, the region on the screen may be represented by a tile (e.g., a block of pixels, such as 16×16 pixels). The ray casting algorithm may firstly determine the viewpoint 530 of the viewer (e.g., a center point of the viewer's eye). Then, the ray casting algorithm may position a conceptual or virtual camera 532 at the viewer's viewpoint and cast a number of rays 534 from the virtual camera 532. In particular embodiments, four rays may be cast from the four corners of a tile positioned within the screen of the virtual camera 532. The group of four casted rays 534 may intersect with the pre-warped surface 500 at four respective intersecting points (e.g., 540A, 540B, 540C, 540D). The sampling points 540A, 540B, 540C, and 540D may form and be associated with a tile 540, which is paired with the surface 500. In particular embodiments, the system may generate a number of tile/surface pairs in this manner.

Once the display engine determines that a tile intersects with a surface, it may then sample each pixel within the tile using the texture data of the surface. In particular embodiments, if a tile contains 16×16 pixels, the display engine (e.g., its pixel block) may use interpolation to determine the texture coordinates (e.g., in (U, V)) of each of the pixel sample locations using the four texture coordinates of the four corners of the projected tile (after the points of intersection in 3D view space have been converted into texture coordinates). Then, the display engine may compute (e.g., using bilinear or bicubic interpolation) the color or distance field properties of each sampling point using the four closest texels.

Figure 6A:
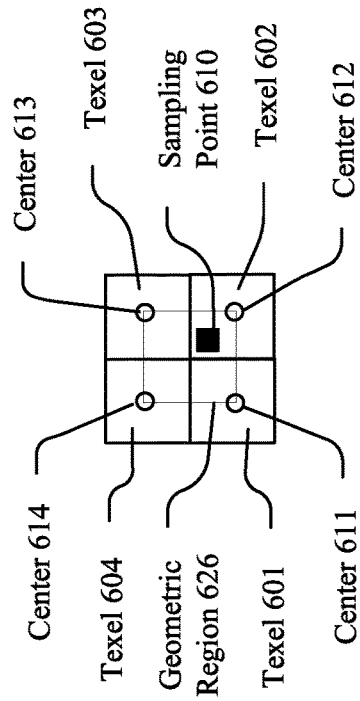
FIGS. 6A-B illustrate an example process for determining the texels that are needed for determining the color or distance field of a sampling point.
Figure 6B:
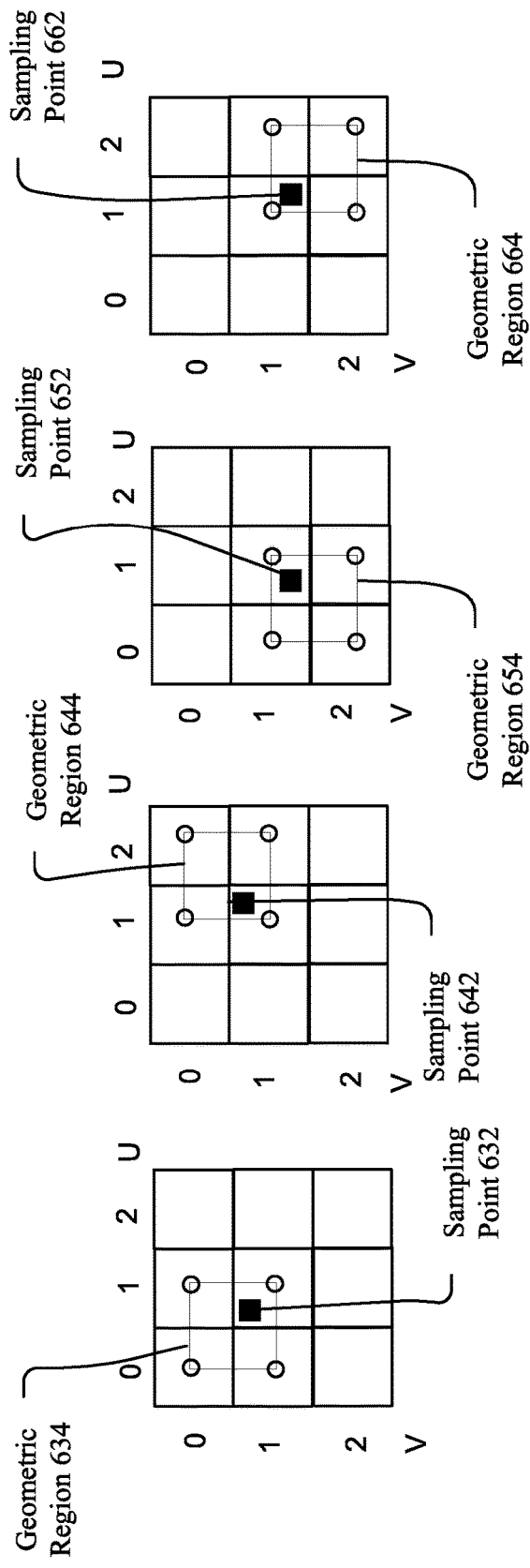

FIGS. 6A-B illustrate an example process for determining the texels that are needed for determining the color or distance field of a sampling point. FIG. 6A illustrate an example sampling point 610 and the corresponding texels (e.g., 601, 602, 603, 604) that are needed to determine the pixel value at the sampling point 610. In particular embodiments, the system may determine a pixel value using interpolation based on the four closest texels. For example, the pixel value corresponding to the sampling point 610 may be determined by interpolating the four closets texels of 601, 602, 603, and 604. To help visualize the texels used for determining the pixel value for the sampling point 610, the figures shown illustrate a geometric region 626 formed by connecting the respective center points 611, 612, 613, 614 of the texels 601, 602, 603, 604. The pixel value of the sampling point 610 is determined by the texels 601, 602, 603, and 604 forming the surrounding the geometric region 626.

FIG. 6B illustrates example sampling points (e.g., 632, 642, 652, 662) and the associated texels for determining the corresponding pixels values. The sampling point 632, 642, 652, 662 may all fall into the same texel as indicated by (U, V) coordinate of (1,1), but may be associated with different groups of texels based on the relative position of the sampling points with respect to the texel (1,1) and its neighboring texels. For example, the sampling point 632 may be within the geometric region 634 determined by the center points of the texels (0, 0), (1, 0), (0, 1), and (1, 1), and therefore the texels (0, 0), (1, 0), (0, 1), and (1, 1) may be identified as the texels needed for the interpolation to determine the pixel value corresponding to the sampling point 632. As another example, the sampling point 642 may be within the geometric region 644 determined by the center points of the texels (1, 0), (2, 0), (1, 1), and (2, 1), and therefore the texels (1, 0), (2, 0), (1, 1), and (2, 1) may be identified as the texels needed for the interpolation to determine the pixel value corresponding to the sampling point 642. As another example, the sampling point 652 may be within the geometric region 654 determined by the center points of the texels (0, 1), (1, 1), (0, 2), and (1, 2), and therefore the texels (0, 1), (1, 1), (0, 2), and (1, 2) may be identified as the texels needed for the interpolation to determine the pixel value corresponding to the sampling point 652. As another example, the sampling point 662 may be within the geometric region 664 determined by the center points of the texels (1, 1), (2, 1), (1, 2), and (2, 2), and therefore the texels (1, 1), (2, 1), (1, 2), and (2, 2) may be identified as the texels needed for the interpolation to determine the pixel value corresponding to the sampling point 662.

In particular embodiments, the system may sample the surface using sampling points that correspond to pixel positions (e.g., each point represents the center of a pixel) to determine the color values of the pixels. In particular embodiments, the pixel size of a sampling point may be substantial the same as the size of the texel. When the viewer zooms out, a surface associated with a rendered object may become smaller in size because of the minification effect. When the minified surface is sampled without changing the texture resolution (i.e., using the same mipmap level), the same pixel size would now be larger than the size of a tile and, consequently, a pixel may cover multiple texels on the minified surface. Therefore, the display engine may need to access and interpolate more texels (e.g., beyond 4×4 texels) in order to determine the colors of 2×2 sampling points. Therefore, sampling a minified surface by zooming out beyond a two-times range introduces uncertainty in terms of the amount and range of texels that may be needed. In particular embodiments, the system may restrict the minification effect of zoom-out operations to be within a two-time range, thereby ensuring that the four sampling points always fall within a 4×4 texel region which could be readout in one read operation and could be sampled parallelly.

In particular embodiments, the 2×2 sampling points would fall within a 4×4 texel region as long as the positions of the adjacent sampling points are no more than 2 texels apart. In particular embodiments, the distance between two sampling points may be measured by Manhattan distance. For example, the constraint may be described by satisfying both of the following two equations:

$$\left|\frac{du}{dx}\right| + \left|\frac{dv}{dx}\right| \leq 2 \quad (1)$$

$$\left|\frac{du}{dy}\right| + \left|\frac{dv}{dy}\right| \leq 2 \quad (2)$$

where the u and v correspond to sampling point coordinates in the (U, V) coordinate space for the texels; x and y correspond to the two-dimensional (X, Y) coordinate space for display pixels. In particular embodiments, the distance between two sampling points may be measured by geometric distance rather than Manhattan distance. In particular embodiments, the size of a texel may be defined by the length of an edge of the texel square.

Figure 7A:
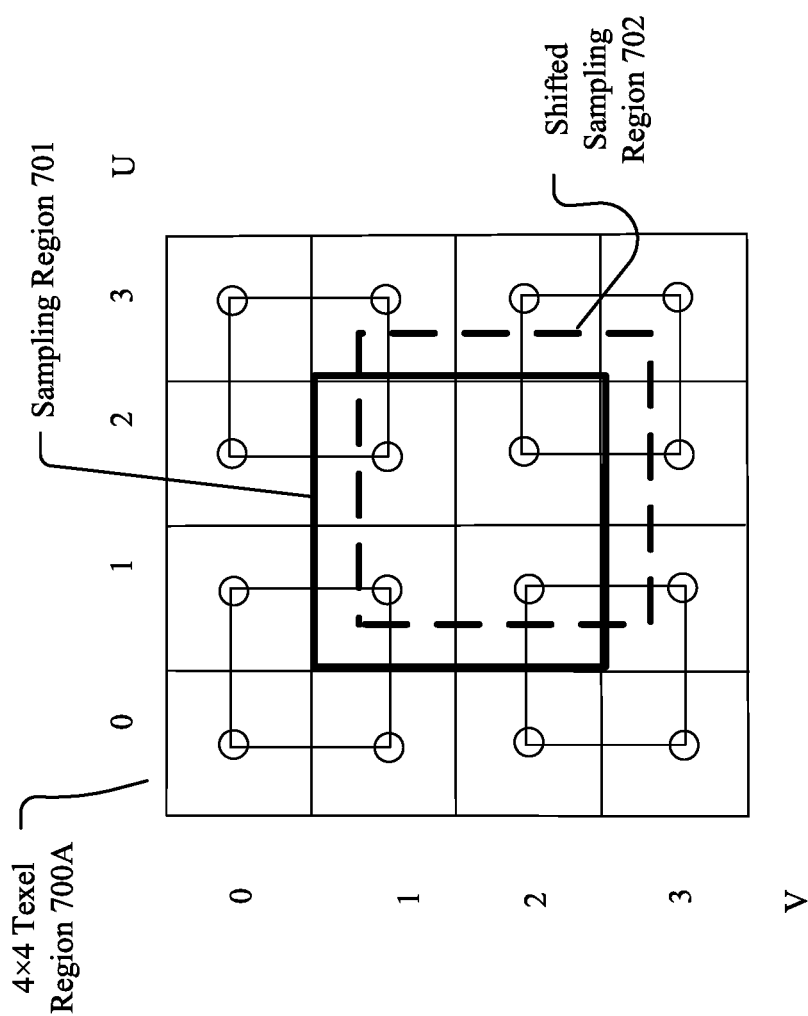
FIG. 7A illustrates an example 4×4 texel region and an example sampling region that represents a set of 2×2 orthogonal sampling points located at the four corners of the sampling region.

As previously described, in particular embodiments, texture sampling may be concurrently performed for 2×2 pixels sampling points. FIG. 7A illustrates an example 4×4 texel region 700A and an example sampling region 701 that represents a set of 2×2 orthogonal sampling points located at the four corners of the sampling region 701. The size of each side of the sampling region 701 may be less than or equal to two times of texel size. The sampling region 701 in FIG. 7A is aligned with the texels along the two dimensions in the 2D space of the texels. When the sampling region 701 is projected on the texels, the associated texels that are needed for interpolation to determine the pixel values at each sampling point (i.e., each of the four corners of the sampling region 701) may be determined using the method as described in FIGS. 6A-B. Each group of four texel centers connected by thin lines represents the four closest texel centers that would be used to filter the sampling point (e.g., a corner of the sampling region 701) located within the thin-line box. For the sampling region 701, the texels that are needed for filtering the four 2×2 sampling points fall within the 4×4 texel region 701. When the sampling region 701 is moved along one or more dimensions of the 2D space, the texels that are needed to filter the four sampling points would always fall within a 4×4 texel region. For example, if the sampling region 701 is shifted to the position shown by sampling region 702, the associated texels for determine the four sampling points (the four corners of the sampling region 702) will continue to fall within the same aligned 4×4 texel region 700A. As another example, when the sampling region 702 is shifted for a larger distance (e.g., more than a half-texel size along one or two dimensions of the 2D space) with respect to the sampling region 701, the sampling region 702 may have its associated texels to fall within an unaligned 4×4 texel region.

Figure 7B:
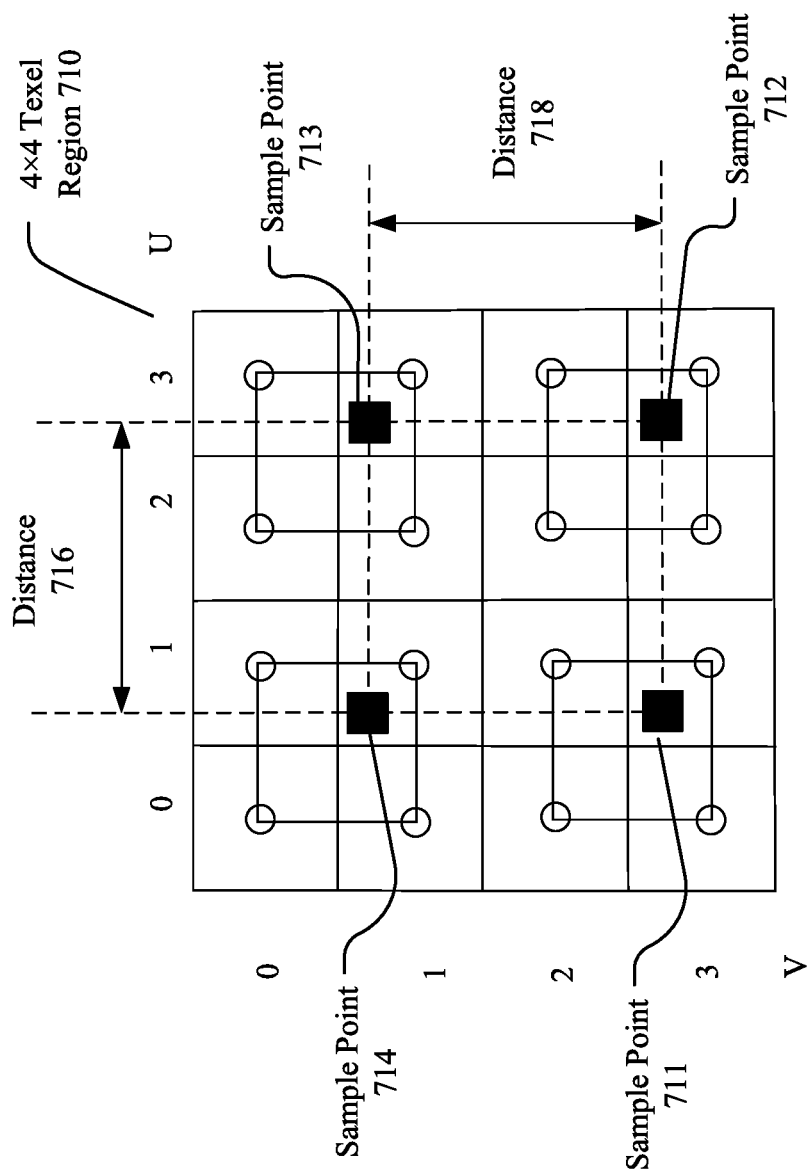
FIG. 7B illustrates example 2×2 orthogonal sampling points within an aligned 4×4 texel region.

FIG. 7B illustrates example 2×2 orthogonal sampling points within an aligned 4×4 texel region. The sampling points 711, 712, 713, and 714 may be the four corner points of a sampling region which is aligned with texels along the two dimensions of the 2D texels space. When the distance 716 between the sampling point 714 and 713 is less than or equal to 2 texels, the corresponding 8 texels that are needed to determine the pixels 714 and 713 may fall within a 2×4 texel region including texels (0, 0), (1, 0), (2, 0) (3, 0), (0, 1), (1, 1), (2, 1), and (3, 1). When the distance 718 between the sampling points 712 and 713 is less than or equal to 2 texels, the corresponding 8 texels of that are needed to determine the pixels for 714 and 713 may fall within a 4×2 texel region. Similarly, when the distance 716 between the sampling point 711 and 712 is less than or equal to 2 texels, the corresponding 8 texels of that are needed to determine the pixels for 711 and 712 may fall within a 2×4 texel region. When the distance 718 between the sampling point 711 and 714 is less than or equal to 2 texels, the corresponding 8 texels of that are needed to determine the pixels for 711 and 714 may fall within a 4×2 texel region. Therefore, when the distances between any two neighboring sampling points are less than or equal to two times of a texel edge length, all the texels that are needed for the interpolation to determine the four pixels values corresponding to the four corners may always be included in a 4×4 texel region regardless how where the sampling region is positioned.

Figure 7C:
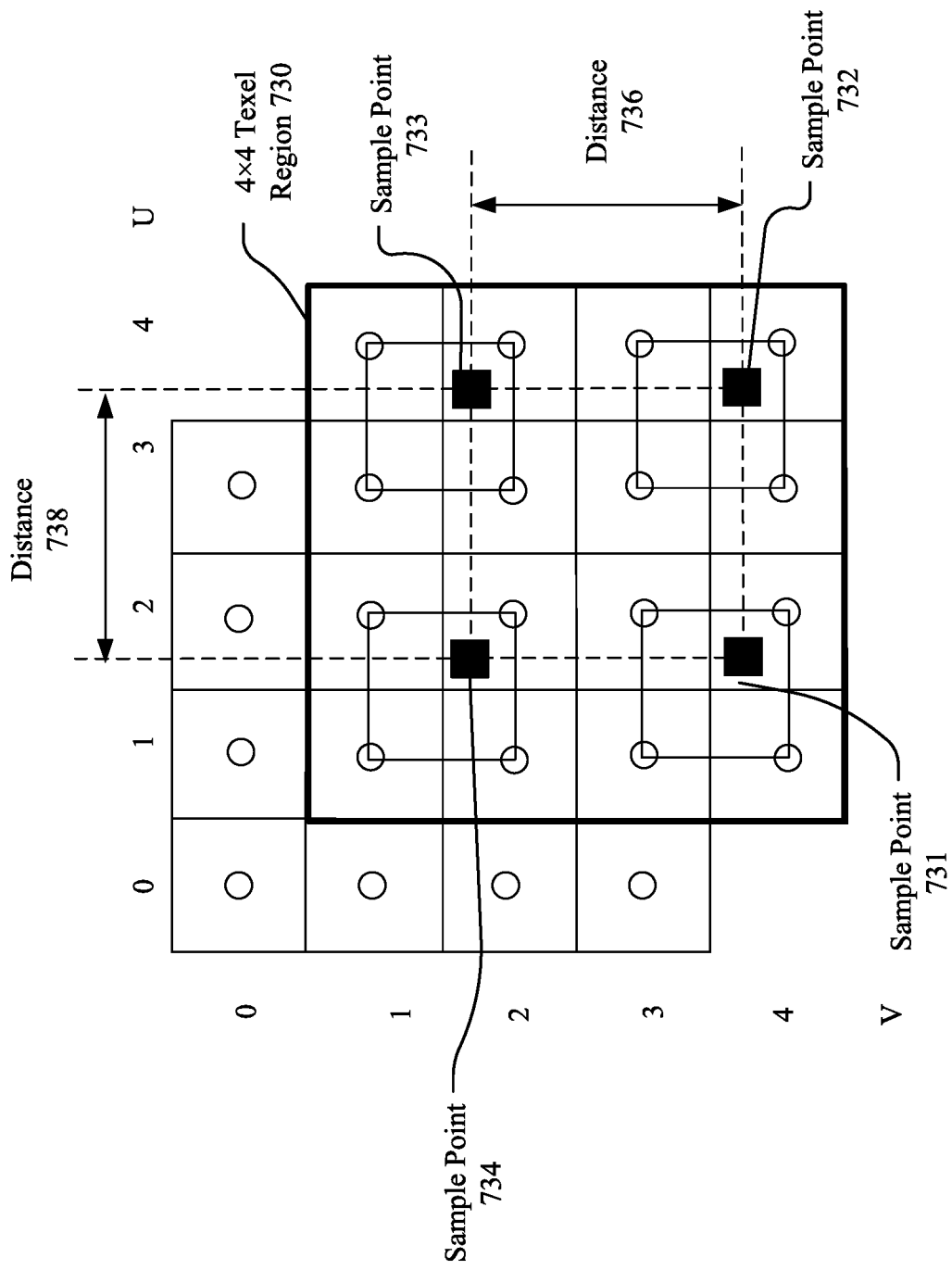
FIG. 7C illustrates example 2×2 orthogonal sampling points within an unaligned 4×4 texel region.

FIG. 7C illustrates example 2×2 orthogonal sampling points within an unaligned 4×4 texel region 730. As discussed above, as along as the distances between any two sampling points are less than or equal to two times of a texel edge length, the texels that are needed to determine the four pixels values may always fit within a 4×4 texel region no matter how the 2×2 sampling points are positioned. However, when the sampling points are shifted by more than half the texel size, the four sample points may fall within a different, unaligned texel region, but the dimensions of that texel region would continue to be 4×4. For example, the sampling points of 731, 732, 733, 734 may fall within an unaligned texel regions 730 when the sampling points positions are changed from the position as illustrated in FIG. 7B to the positions as illustrated in FIG. 7C.

Figure 7D:
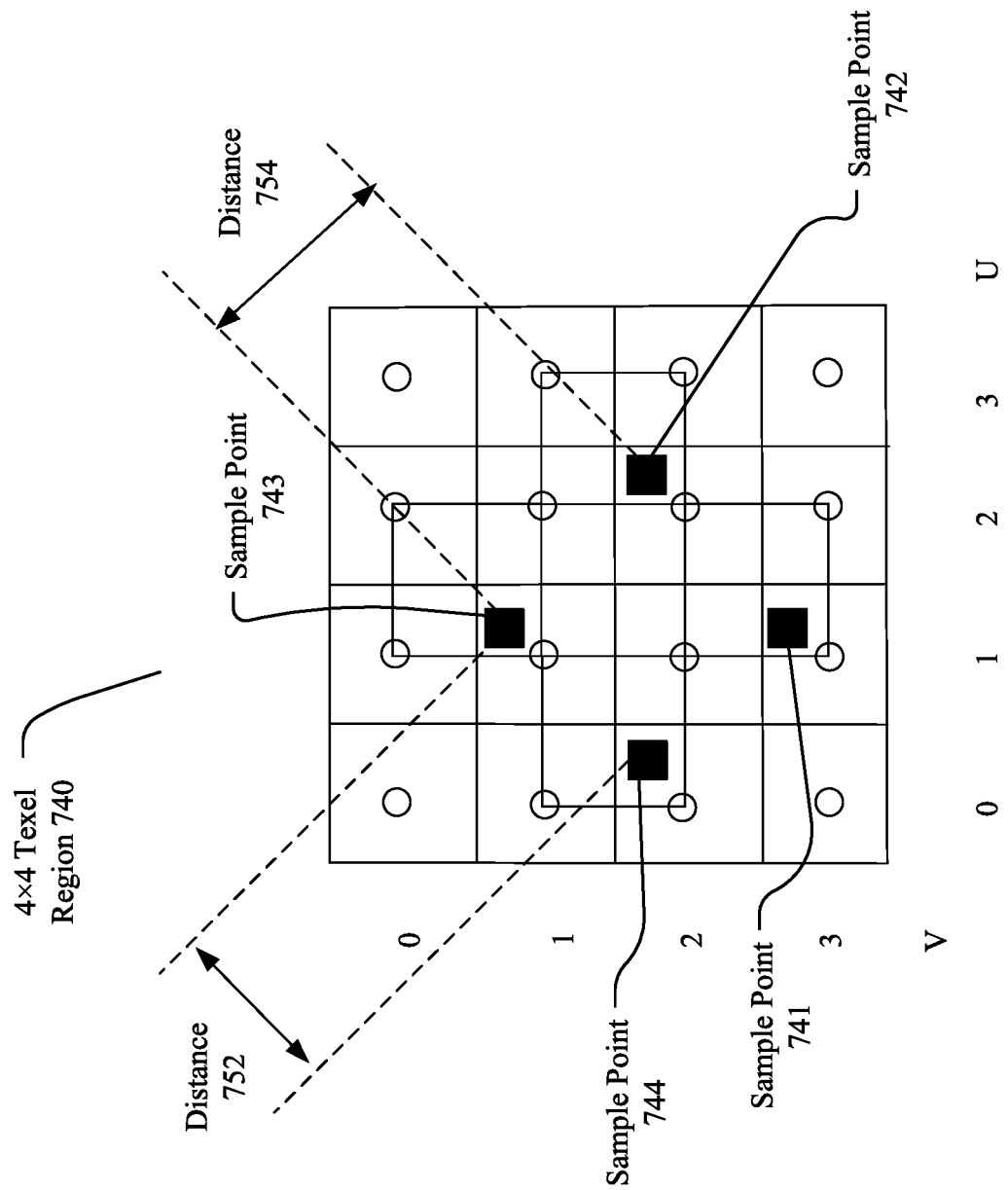
FIG. 7D illustrates example 2×2 non-orthogonal sampling points within a 4×4 texel region.

FIG. 7D illustrates example 2×2 non-orthogonal sampling points (e.g., 741, 742, 743, 744) within a 4×4 texel region 740. In particular embodiments, the system may use non-orthogonal sampling points to sample the surfaces. For the non-orthogonal sampling points, as long as the distances between any two neighboring sampling points are less than or equal to 2 times of texel size, the texels that are needed to determine the four pixels values may always fit within a 4×4 texel region. As an example and not by way of limitation, the sampling points 741, 742, 743, 744 may be positioned at a 45 degrees position relative to the (U, V) coordinate space for the texels in the texel region 740. The distance 752 between the sampling point 744 and 743 and the distance 754 between the sampling point 743 and 742 may equal to V times of a texel's edge length (corresponding to a smaller sampling region than the sampling regions 701 and 702 in FIGS. 7A-B) which is less than two times of texel size. Each group of four texel centers connected by thin lines indicate the four closest texel centers that are used to filter the sample point (741, 742, 743, or 744) falling within the bounded box. As can be seen from FIG. 7D, even when the sampling points 741, 742, 743, and 744 have been rotated, the texel regions needed to filter the four sampling points 741, 742, 743, and 744 would continue to fit in a 4×4 texel region 740, which can read out with one read operation when the distances between adjacent sampling points (e.g., 744 and 743, 744 and 742) are less than two times of texel edge length.

In particular embodiments, the system may provide a number of fallback solutions when the two-time zoom out rule is violated. For example, a surface corresponding to a label which is normally magnified may cause aliasing when it is minified more than two times. In this case, the system may generate a small image from the label and may render the small image (rather than performing the minification) to avoid aliasing. In particular embodiments, the system may implement foveated images. A foveated image may have different resolutions at different portions of the image and may be associated with a mipmap chain having multiple texture levels. When the two-time zoom out rule is violated on an foveated image, the system may select a coarser resolution texture as a fallback solution to avoid the excess texels needed if finer resolutions are used. By switching to a coarser texture, the texels needed for filtering 2×2 sampling points would continue to fall within 4×4 texels. In particular embodiments, when the two-time zoom out rule is violated, the system may regenerate the pre-warped surfaces on the GPUs or smart video decoders associated with the body wearable computing system and resend the new pre-warped surfaces to the headset system.

As discussed earlier in this disclosure, traditional GPUs access texel buffer memory in quads and need sequential and separate operations to retrieve the texels that are needed to determine multiple sampling points. For example, four sampling points projected onto a 3D model may have arbitrary position and distances based on the shape of the model. To determine the pixel value for each of the four sampling points, traditional GPUs need to access the texel buffer memory in four separate and sequential read operations in order to obtain the four groups of texels needed, which is slow and inefficient. Particular embodiments of the display engine may use the two-time zoom out rule to allow all texels that are needed to filter a set of 2×2 sampling points to always fall within a 4×4 texel region. The 4×4 texel region stored in the texel buffer memory could be retrieved using one read operation, as will be described later. Therefore, particular embodiments of the system reduce the bandwidth usage for reading texels from texel buffer memory and provide better efficiency by accessing the 16 texels in parallel rather than in separate sequential read operations.

Figure 8A:
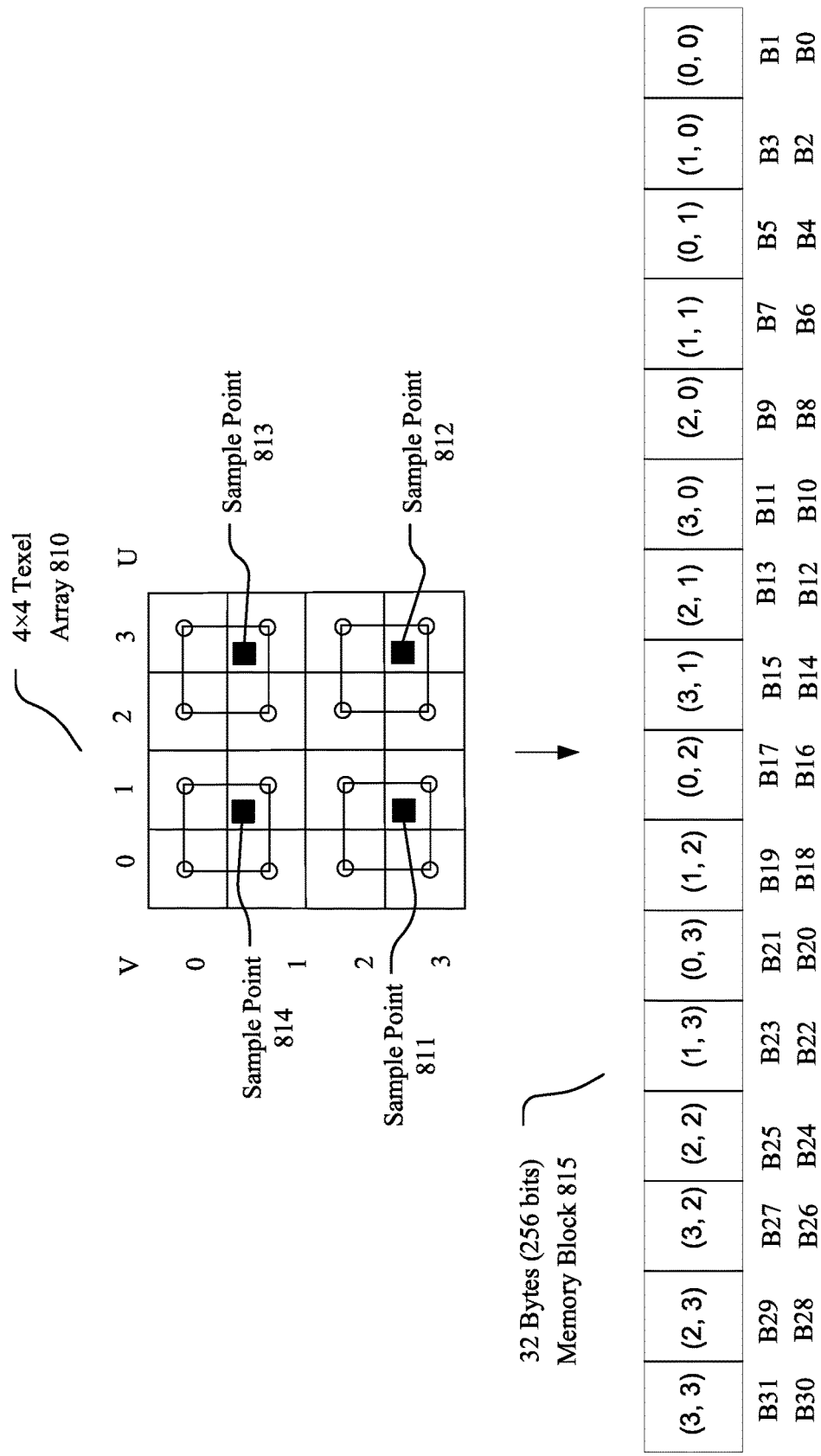
FIG. 8A illustrates an example 4×4 texel array stored in a 32 bytes texel memory of control block with an interleaved pattern.

FIG. 8A illustrates an example 4×4 texel array 810 stored in a 32 bytes memory block 815 with an interleaved pattern. In particular embodiments, the system may store a 2D texel array in a memory block with an interleaved swizzle pattern to allow all the texels in the 2D texel array to be retrieved parallelly from memory. As an example and not by way of limitation, the 4×4 texel array 810 may include 16 texels as indicated by the (U, V) coordinates and each texel may have 16 bits data. Using the method as described in FIGS. 6A-B, the 16 texels may be identified as the texels that are needed for interpolation to determine the pixel values for the four sampling points 811, 812, 813, and 814. The 16 texels may be stored in the same memory block, for example, a 32 bytes (256 bits) memory 815 with an interleaved pattern as illustrated in FIG. 8A. When the 4×4 texel array 810 is needed, the system may access the 32 Bytes (256 bits) memory 815 in one read operation and retrieve all the 16 texels in parallel. Then, the system may perform interpolation using the retrieved texels for the four sampling points 811, 812, 813, and 814.

Figure 8B:
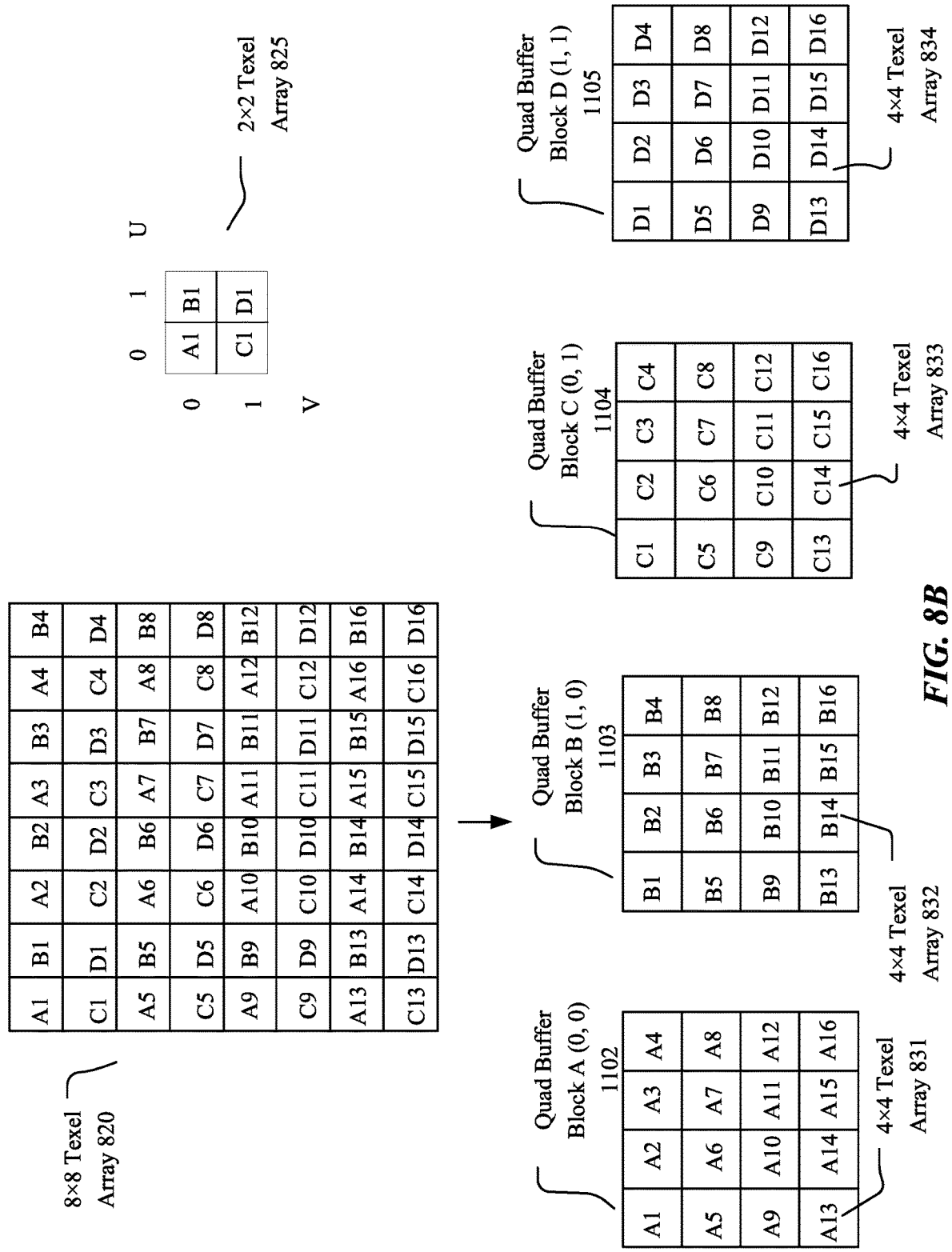
FIGS. 8B-C illustrate an example 8×8 texel array stored in 16 independent texel buffer blocks to allow any 4×4 texel array to be read in one read operation.
Figure 8C:
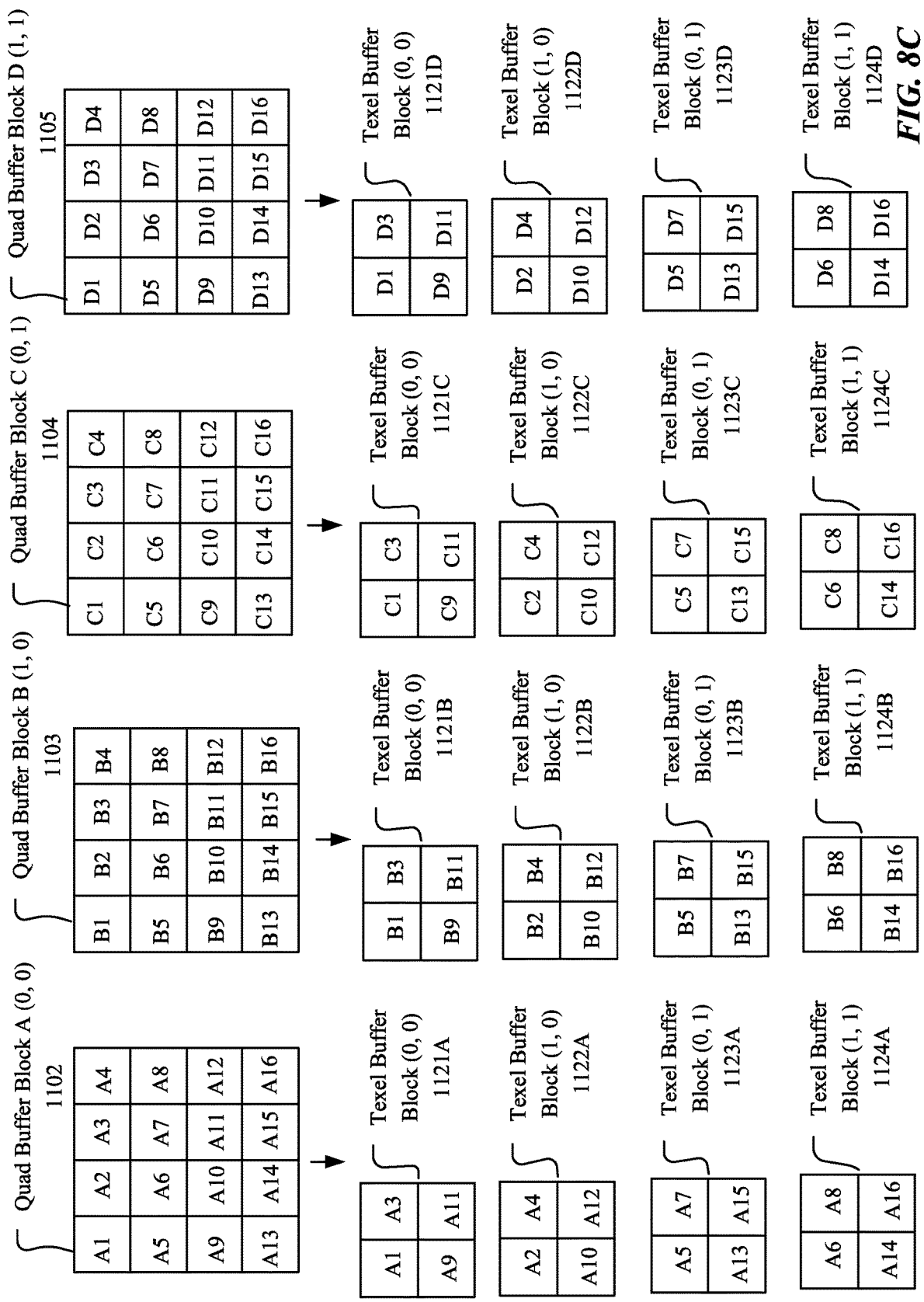

FIGS. 8B-C illustrate an example 8×8 texel array stored in 16 independent texel buffer blocks to allow any 4×4 texel array to be read in one read operation. In particular embodiments, the display engine may include texel buffer memory in the filter blocks (e.g., 1002, 1003, 1004 in FIG. 10) of the pixel blocks (e.g., 930A, 930B in FIG. 9). In particular embodiments, the texel buffer memory may be organized in multiple memory block levels including quad buffer block, texel buffer block, and sub-level buffer units. A pixel block of the display engine may include three filter blocks each including four quad buffer blocks (e.g., 1102, 1103, 1104, 1105 in FIG. 11A). Each quad buffer block may include four texel buffer blocks (e.g., 1121, 1122, 1123, 1124 in FIG. 11B). Each texel buffer block may include two sub-level buffer units (e.g., 512×2 buffer unit 1201A and 512×10 buffer unit 1202B in FIG. 12A). As a result, the pixel block of the display engine of particular embodiments may include 16 texel buffer blocks which could be addressed separately and accessed parallelly, and therefore the display engine may read one texel from each of the 16 texel buffer block at the same time and retrieve 16 texels parallelly.

In particular embodiments, the display engine may load a 32×32 texel array from texel memory of the control block into the texel buffer memory of the pixel block. The display engine may store/organize the 32×32 texel array with a pattern so that any 4×4 texel array (either aligned or unaligned array) may have its 16 texels being stored in 16 separate text buffer blocks with one texel in each texel buffer block to allow any array with 4×4 texels to be read with one read operation. For description simplicity purpose, an example 8×8 texel array 820, as shown in FIG. 8B, is used to illustrate the process, principle, and pattern for storing and organizing the 32×32 texel array in the texel buffer memory to allow parallel retrieving any aligned or unaligned array with 4×4 texels in one read operation. The 8×8 texel array 820 may include 16 sub-arrays each having 2×2 texels (e.g., 2×2 texel array 825). For description simplicity purpose, four texels in each 2×2 texel array (e.g., array 825) may be represented by four characters A, B, C and D corresponding to the (U, V) coordinates of (0, 0), (1, 0), (0, 1), and (1, 1), respectively. For example, in the 2×2 texel array 825, the texel (0, 0), texel (1, 0), texel (0, 1), and texel (1, 1) may be represented by A1, B1, C1, and D1, respectively.

In particular embodiments, the four quad buffer blocks (e.g., 1102, 1103, 1104, 1105 in FIG. 11A) may each include the texels at the same position as indicated by (U, V) coordinates in the respective 2×2 texel arrays. For example, the quad buffer block 1102 may include the texel at the position of (0, 0) in each 2×2 texel array. For the example 8×8 texel array 820, the quad block 1102 may include the texels from A1 to A16 each of which is at the position (0, 0) in its corresponding 2×2 texel array. The texels A1-16 in the quad buffer block 1102 may conceptually form a 4×4 texel array 831 as shown in FIG. 8B. As another example, the quad buffer block 1103 may include the texel at the position of (1, 0) in each 2×2 texel array. For the example 8×8 texel array 820, the quad block 1103 may include the texels from B1 to B16 each of which is at the position (1, 0) in its corresponding 2×2 texel array. The texels B1-16 in the quad buffer block 1103 may conceptually form a 4×4 texel array 832 as shown in FIG. 8B. As another example, the quad buffer block 1104 may include the texel at the position of (0, 1) in each 2×2 texel array. For the example 8×8 texel array 820, the quad block 1104 may include the texels from C1 to C16 each of which is at the position (1, 0) in its corresponding 2×2 texel array. The texels C1-16 in the quad buffer block C 1104 may conceptually form a 4×4 texel array 833 as shown in FIG. 8B. As another example, the quad buffer block 1105 may include the texel at the position of (1, 1) in each 2×2 texel array. For the example 8×8 texel array 820, the quad block 1105 may include the texels from D1 to D16 each of which is at the position (1, 1) in its corresponding 2×2 texel array. The texels D1-16 in the quad buffer block 1105 may conceptually form a 4×4 texel array 834 as shown in FIG. 8B.

FIG. 8C illustrates example patterns that are used for storing texels in texel buffer blocks. In particular embodiments, a quad buffer block (e.g., 1102, 1103, 1104, 1105 in FIG. 11A) may include four texel buffer blocks (e.g., 1121, 1122, 1123, 1124 in FIG. 11B). The texels stored in each quad buffer block may conceptually form a 4×4 texel array (e.g., A1-16) including four 2×2 texel arrays. For example, the A1-16 stored in the quad buffer block 1102 may form a 4×4 texel array including four 2×2 texel arrays of (A1, A2, A5, A6), (A3, A4, A7, A8), (A9, A10, A13, A14), and (A11, A12, A15, A16). Each texel in a 2×2 texel array may have its local (U, V) coordinates. For example, the texel A1, A2, A5, A6 may have the local (U, V) coordinates of (0, 0), (1, 0), (0, 1), and (1, 1) in the texel array of (A1, A2, A5, A6), respectively. In particular embodiments, each texel buffer block of a quad buffer block may include texels at the same local (U, V) coordinate. For example, the texel buffer block 1121A may include A1, A3, A9, and A11 each of which is at the position of (0, 0) in respective 2×2 texel arrays of (A1, A2, A5, A6), (A3, A4, A7, A8), (A9, A10, A13, A14), and (A11, A12, A15, A16). As another example, the texel buffer block 1122A may include A2, A4, A10, and A12 each of which is at the position of (1, 0) in respective 2×2 texel arrays of (A1, A2, A5, A6), (A3, A4, A7, A8), (A9, A10, A13, A14), and (A11, A12, A15, A16). As another example, the texel buffer block 1123A may include A5, A7, A13, and A15 each of which is at the position of (0, 1) in respective 2×2 texel arrays of (A1, A2, A5, A6), (A3, A4, A7, A8), (A9, A10, A13, A14), and (A11, A12, A15, A16). As another example, the texel buffer block 1124A may include A6, A8, A14, and A16 each of which is at the position of (1, 1) in respective 2×2 texel arrays of (A1, A2, A5, A6), (A3, A4, A7, A8), (A9, A10, A13, A14), and (A11, A12, A15, A16). Similarly, the texels buffer blocks of other quad buffer blocks may store the texels of the corresponding quad buffer block in similar patterns, as shown in FIG. 8C. The texels stored in a texel buffer block may form a two-dimensional array in that texel buffer. For example, the texel array stored in the texel buffer block 1121A may include texels A1, A3, A9, and A11 corresponding to a local (U, V) coordinates of (0, 0), (1, 0), (0, 1), and (1, 1), respectively. As a result, the 64 texels in the 8×8 texel array may be stored in the 16 texel buffer blocks (e.g., 1121A-D, 1122A-D, 1123A-D, 1124A-

D) in such a pattern that allows any sub-array with 4×4 texels to have its 16 texels being stored in the 16 texel buffer blocks separately (with one texel in each texel buffer block), as will be discussed later.

Figure 8D:
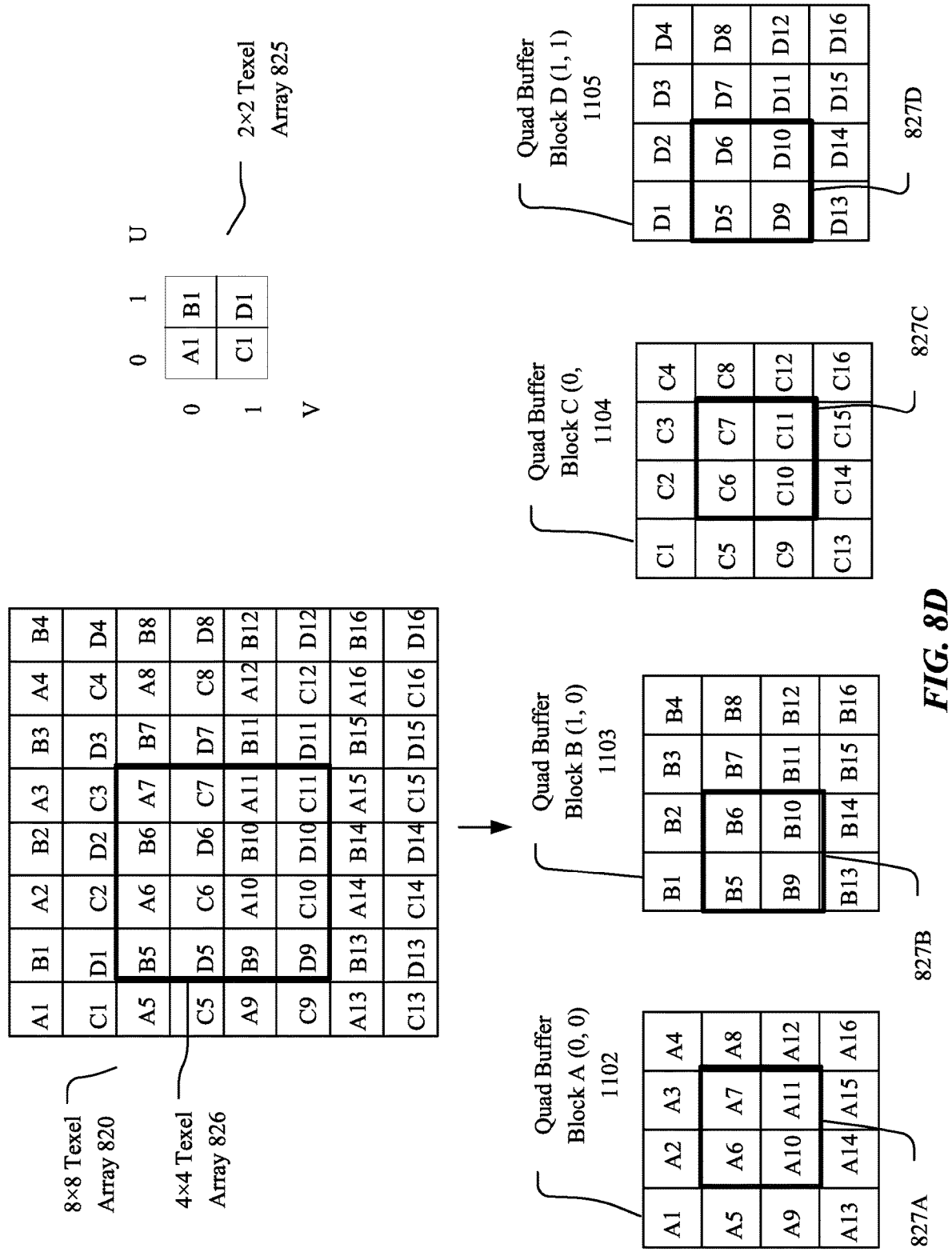
FIGS. 8D-E illustrate an example 4×4 texel array selected from an 8×8 texel array stored in 16 independent texel buffer blocks.
Figure 8E:
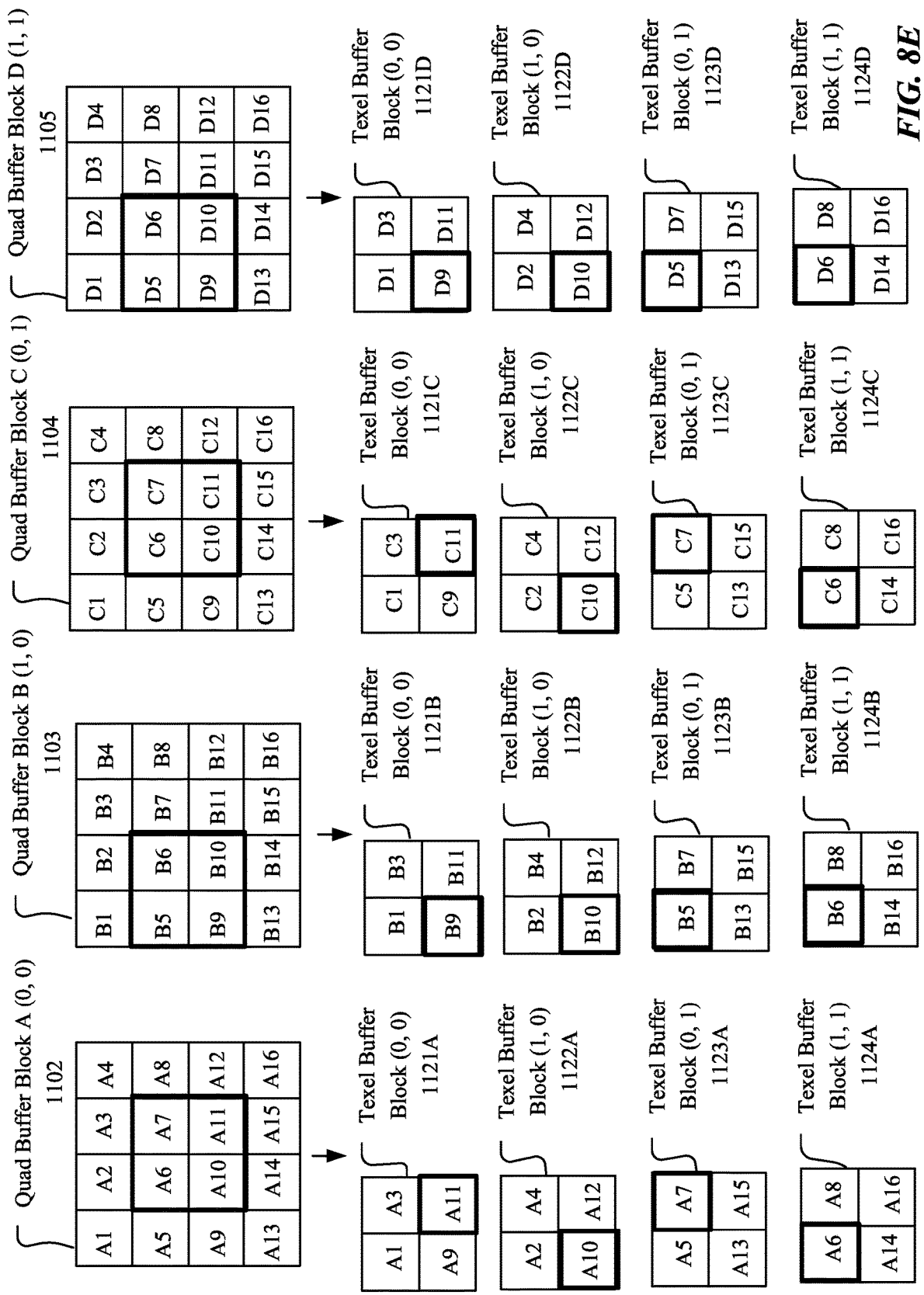

FIGS. 8D-E illustrate an example 4×4 texel array selected from an 8×8 texel array stored in 16 independent texel buffer blocks. In particular embodiments, the sampling points (e.g., 16×16 pixels) associated with a tile may fall within an aligned 4×4 texel array (e.g., from A1 to D6 in texel array 820) or an unaligned 4×4 texel array (e.g., from B5 to C11 in texel array 820). The patterns, as described earlier, that are used for storing and organizing the texels in the quad buffer blocks and texel buffer blocks may allow any aligned or unaligned 4×4 texel array to have its 16 texels being stored in the 16 independent texel buffer blocks, and therefore allow the 16 texels in the 4×4 texel array to be read out using one read operation. As an example and not by way of limitation, the sampling points may fall within a region corresponding to an unaligned 4×4 texel array 826 (as marked by the square in solid thick line). The 4×4 texel array 826 may be divided into four groups of texels corresponding to the texel positions in respective 2×2 texel arrays. For example, a first group of texels may include B5, B6, B9, and B10 corresponding to the texel position (0, 0) in respective 2×2 texel arrays of (B5, A6, D5, C6), (B6, A7, D6, C7), (B9, A10, D9, C10), and (B10, A11, D10, C11). The second group of texels may include A6, A7, A10, and A11 corresponding to the texel position (1, 0) in respective 2×2 texel arrays of (B5, A6, D5, C6), (B6, A7, D6, C7), (B9, A10, D9, C10) and (B10, A11, D10, C11). The third group of texels may include C6, C7, C10, and C11 corresponding to the texel position (0, 1) in respective 2×2 texel arrays of (B5, A6, D5, C6), (B6, A7, D6, C7), (B9, A10, D9, C10) and (B10, A11, D10, C11). The fourth group of texels may include D5, D6, D9, and D10 corresponding to the texel position (1, 1) in respective 2×2 texel arrays of (B5, A6, D5, C6), (B6, A7, D6, C7), (B9, A10, D9, C10) and (B10, A11, D10, C11). As shown in FIG. 8D, the first, second, third, and four groups of texels as described above are stored in respective quad buffer blocks of 1102, 1103, 1104, and 1105, as marked by the squares (e.g., 827A, 827B, 827C, 827D) in solid thick lines. FIG. 8E illustrates how the texels in the first, second, third, and fourth group of texels are stored in separate texel buffer blocks. For example, the texels of A6, A7, A10, and A11 of the first group may be stored in the texel buffer blocks of 1124A, 1123A, 1122A, and 1121A, respectively. The texels of B5, B6, B9, and B10 in the second group may be stored in the texel buffer blocks of 1123B, 1124B, 1121B, and 1122B, respectively. The texels of C6, C7, C10, and C11 of the third group may be stored in the texel buffer blocks of 1124C, 1123C, 1122C, and 1121C, respectively. The texels of D5, D6, D9, and D10 of the fourth group may be stored in the texel buffer blocks of 1123D, 1124D, 1121D, and 1122D, respectively. Similar to unaligned 4×4 texel array, any aligned 4×4 texel array (e.g., from A1 to D6) selected from the 8×8 texel array 820 may have its 16 texels being stored in the 16 independent texel buffer blocks, respectively. Therefore, any 4×4 texel array (aligned or unaligned) selected from the 8×8 texel array 820 may have its 16 texels being stored in 16 independent/ separate texel buffer blocks which can be addressed and accessed at the same time. As a result, any 4×4 texel array (aligned or unaligned) selected from the 8×8 texel array 820 may be read in one read operation, which significantly improves the memory access efficiency for retrieving texels from texel buffers.

Figure 8F:
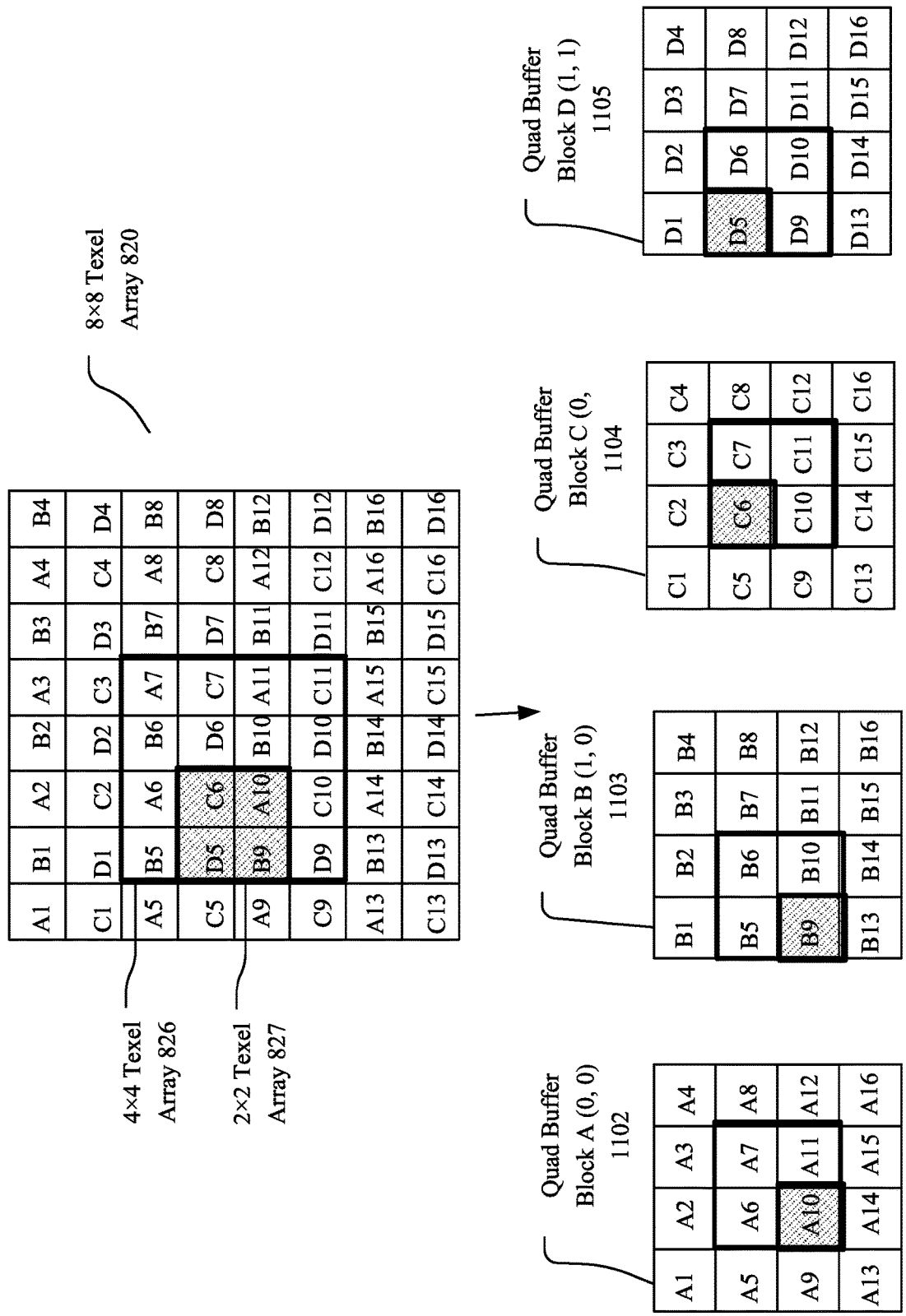
FIGS. 8F-G illustrate an example 2×2 texel array which is selected from an 8×8 texel array stored in 16 independent texel buffer blocks and can be read from the texel buffer with reduced multiplexing operations.
Figure 8G:
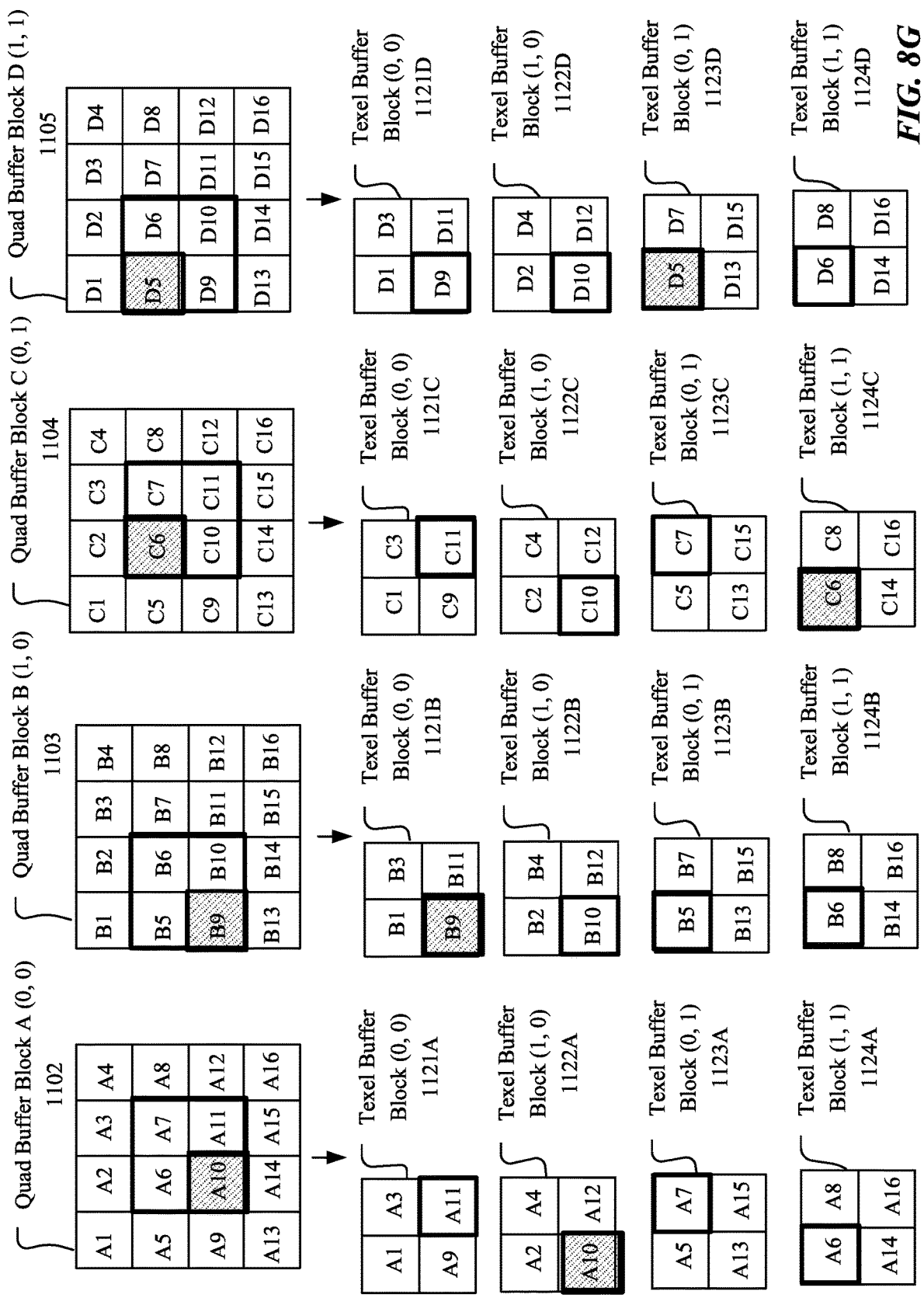

FIGS. 8F-G illustrate an example 2×2 texel array which is selected from an 8×8 texel array stored in 16 independent texel buffer blocks and can be read from the texel buffer with reduced multiplexing operations. In particular embodiments, a 4×4 texel array may be used to determine a number of pixels (e.g., 16×16 pixels) associated with a sampling tile which falls within the 4×4 texel region. Each pixel may be determined based on four texels based on the position of the corresponding sampling point. For example, the four texels needed for determining a pixel at a sampling position may be determined using the methods as descripted in FIGS. 6A-B. As an example and not by way of limitation, the four texels in the 2×2 texel array 827 may be determined as the texels needed for determining a pixel value and may be selected from the 4×4 texel array 826. The 2×2 texel array 827 may include D5, C6, B9, and A10 as marked by the shaded square. Since the texels are stored in the quad buffer blocks and texel buffer blocks in a pattern as described above, the four texels of D5, C6, B9, and A10 are stored in four quad buffer blocks of 1102, 1103, 1104, and 1105, respectively (as marked by the shaded square in each quad buffer block in FIG. 8F).

FIG. 8G shows that the four texels D5, C6, B9, and A10 are stored in four texel buffer blocks of 1123D, 1124C, 1121B, and 1122A, respectively, as marked by the shaded square in each texel buffer block. In particular embodiments, any 2×2 texel array selected from the 4×4 texel array 826 may have its 4 texels being stored in four separate quad buffer blocks and four separate texel buffer blocks. Therefore, selecting any 2×2 texel array (aligned or unaligned) from a 4×4 texel array (aligned or unaligned) may require selecting one out of four texel buffer blocks in each of the quad buffer blocks. As a result, each sampling position processed by a sample filter block (e.g., 1106, 1107, 1108, 1109 in FIG. 11A) may only need four 4:1 multiplexors (e.g., 1125E, 1125F, 1125G, 1125H in FIG. 11B). Therefore, selecting any unaligned 2×2 block of texels in the unaligned 4×4 block of texels may require selecting one out of four selected entries in each of the quad buffer block, which significantly reduces the multiplexing operations that are needed for accessing and sampling the texels in the quad buffer blocks.

In particular embodiments, the display engine may access a 4×4 texel array (aligned or unaligned) and extract four 2×2 texel arrays (aligned or unaligned) within the 4×4 texel array for sampling process. Each 2×2 texel array (e.g., for one sampling point) may only needed four 4:1 multiplexors to be selected and retrieved from 4 texel buffer blocks. The four 2×2 texel array may be extracted parallelly from the 4×4 texel array which may be accessed and retrieved parallelly (e.g., using one read operation) from the quad buffer blocks and texel buffer blocks. This allows four time as many texels to be processed per memory access and allows the memory access to be four times wider than as traditional graphic rendering systems, and therefore significantly improves the memory access efficiency of the headset system and reduces the multiplexing operations and power consumption that are needed for memory access.

Figure 9:
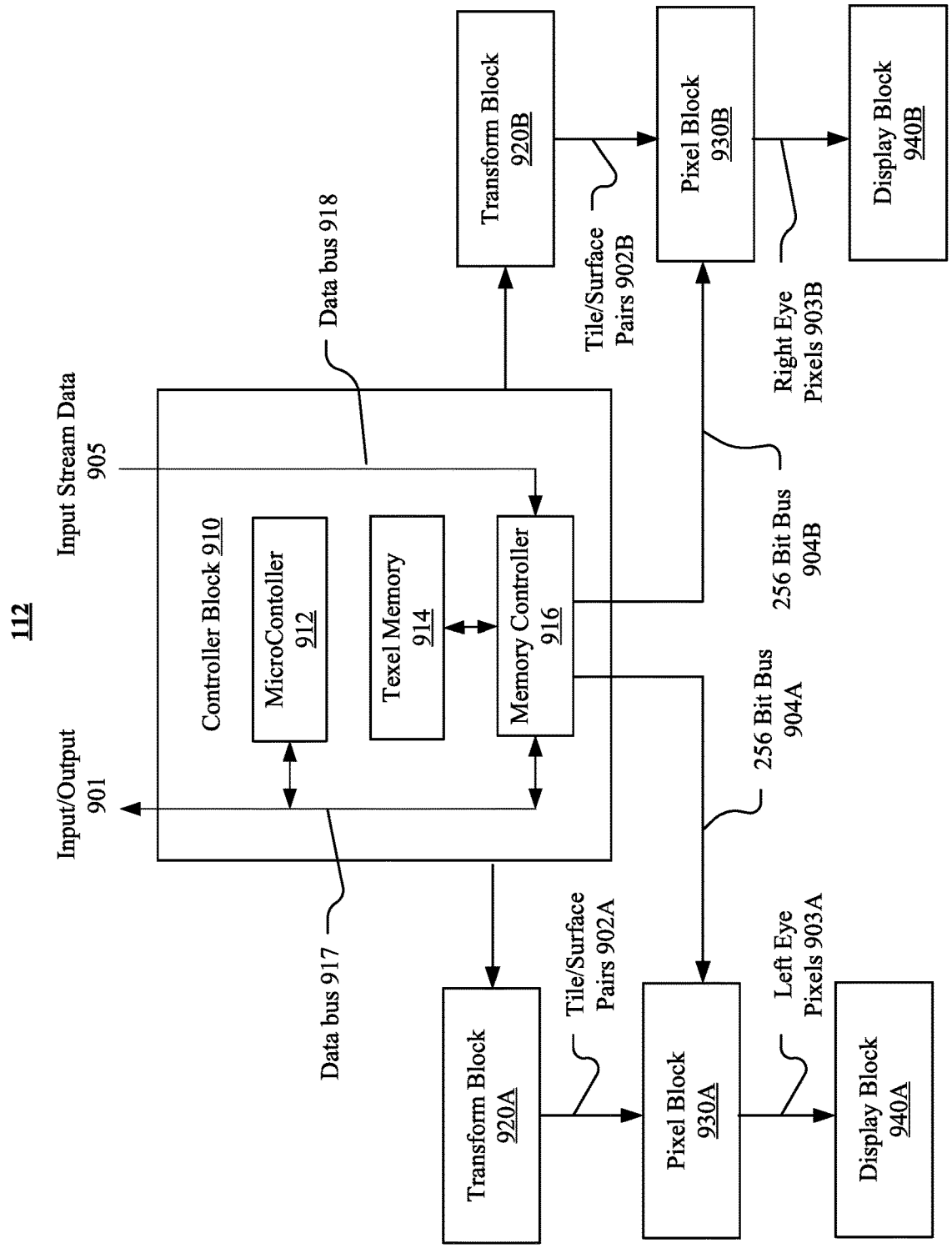
FIG. 9 illustrates a system diagram for a display engine.

FIG. 9 illustrates a system diagram for a display engine 112. In particular embodiments, the display engine 112 may include a control block 910, transform blocks 920A and 920B, pixel blocks 930A and 930B, display blocks 940A and 940B, etc. One or more of the components of the display engine 112 may be configured to communicate via a high-speed bus, shared memory, or any other suitable method. As shown in FIG. 9, the control block 910 of display engine 112 may be configured to communicate with the transform blocks 920A and 920B, pixel blocks 930A and 930B, and display blocks 940A and 940B. As explained in further detail herein, this communication may include data as well as control signals, interrupts and other instructions.

In particular embodiments, the control block 910 may receive input from the body wearable computing system (e.g., 114 in FIG. 1) and initialize a pipeline in the display engine to finalize the rendering for display. In particular embodiments, the control block 910 may receive data and control packets from the body wearable computing system. The data and control packets may include information such as one or more surfaces comprising texture data and position data and additional rendering instructions. The control block 910 may distribute data as needed to one or more other blocks of the display engine 112. The control block 910 may initiate pipeline processing for one or more frames to be displayed. In particular embodiments, the eye display systems 116A and 116B may each comprise its own control block 910. In particular embodiments, one or more of the eye display systems 116A and 116B may share a control block 910.

In particular embodiments, the transform blocks 920A and 920B may determine initial visibility information for surfaces to be displayed in the artificial reality scene. In general, the transform blocks 920A and 920B may cast rays from pixel locations on the screen and produce filter commands (e.g., filtering based on bilinear or other types of interpolation techniques) to send to the pixel blocks 930A and 930B. The transform blocks 920A and 920B may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and may produce results to send to the pixel blocks 930A and 930B.

In general, the transform blocks 920A and 920B may each comprise a four-stage pipeline, in accordance with particular embodiments. The stages of a transform block 920A or 920B may proceed as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems 116A and 116B of the headset system 110. The transform blocks 920A and 920B may determine whether each ray bundle intersects with surfaces in the scene by comparing a bounding box of each tile to bounding boxes for the surfaces. If a ray bundle does not intersect with an object, it may be discarded. Tile-surface intersections are detected, and the corresponding tile-surface pair is passed to the pixel blocks 930A and 930B.

In general, the pixel blocks 930A and 930B may determine color values from the tile-surface pairs to produce pixel color values, in accordance with particular embodiments. The color values for each pixel may be sampled from the texture data of surfaces received and stored by the control block 910. The pixel blocks 930A and 930B may receive tile-surface pairs from the transform blocks 920A and 920B and may schedule bilinear filtering. For each tile-surface pair, the pixel blocks 930A and 930B may sample color information for the pixels within the tile using color values corresponding to where the projected tile intersects the surface. In particular embodiments, the pixel blocks 930A and 930B may process the red, green, and blue color components separately for each pixel. In particular embodiments, the pixel block 930A of the display engine 112 of the first eye display system 116A may proceed independently, and in parallel with, the pixel block 930B of the display engine 112 of the second eye display system 116B. The pixel block may then output its color determinations to the display block.

In general, the display blocks 940A and 940B may receive pixel color values from the pixel blocks 930A and 930B, coverts the format of the data to be more suitable for the scanline output of the display, apply one or more brightness corrections to the pixel color values, and prepare the pixel color values for output to the display. The display blocks 940A and 940B may convert tile-order pixel color values generated by the pixel blocks 930A and 930B into scanline or row-order data, which may be required by the physical displays. The brightness corrections may include any required brightness correction, gamma mapping, and dithering. The display blocks 940A and 940B may output the corrected pixel color values directly to the physical display (e.g., pupil display 156 in FIG. 1 via the driver 154) or may output the pixel values to a block external to the display engine 112 in a variety of formats. For example, the eye display systems 116A and 116B or headset system 110 may comprise additional hardware or software to further customize backend color processing, to support a wider interface to the display, or to optimize display speed or fidelity.

In particular embodiments, the controller block 910 may include a microcontroller 912, a texel memory 914, a memory controller 916, a data bus 917 for I/O communication, a data bus 918 for input stream data 905, etc. The memory controller 916 and the microcontroller 912 may be coupled through the data bus 917 for I/O communication with other modules of the system. The microcontroller 912 may receive control packages such as position data and surface information though the data bus 917. The input stream data 905 may be input to controller blocks 910 from the body wearable computing system after being set up by the microcontroller 912. The input stream data 905 may be converted to the required texel format and stored into the texture memory 914 by the memory controller 916. In particular embodiments, the texel memory 914 may be static random-access memory (SRAM).

In particular embodiments, the body wearable computing system may send input stream data 905 to the memory controller 916, which may convert the input stream data into texels with required formats and store the texels with swizzle patterns in the texel memory 914. The texel memory organized in these swizzle patterns may allow the texels (e.g., in 4×4 texel blocks) that are needed for determining at least one color component (e.g., red, green, and/or blue) of every pixel associated with a tile (e.g., "tile" refers to an aligned block of pixels, such as a block of 16×16 pixels) to be retrieved by the pixel bocks 930A and 930B in 265-bit units, which are suitable to be stored in the texel buffer memory read operation. As a result, the headset could avoid the excess multiplexing operations that are needed for reading and assembling texel array if the texel array is not stored in such patterns, and therefore reduces computational resource requirement and power consumption of the headset system.

In particular embodiments, the pixel blocks 920A and 920B may generate pixel data for display based on retrieved texels from the texel memory 912. The memory controller 916 may be coupled to pixel blocks 930A and 930B through two 256 bits data buses 904A and 904B, respectively. The pixel bocks 930A and 930B may receive the tile/surface pair from the respective transform blocks 920A and 920B and may identify the texels that are needed to determine all the pixels associated with the tile using the method as described in FIGS. 6A-B. The pixel blocks 930A and 930B may parallelly retrieve the identified texels (e.g., a 4×4 texel array) from the texel memory 914 through the memory controller 916 and the 256 bits data buses 904A and 904B. For example, the 4×4 texel array that are needed to determine all the pixels associated with a tile may be stored in one memory block and may be retrieved using one memory read operation. The pixel blocks 930A and 930B may use multiple sample filter blocks to parallelly perform interpolation on different groups of texels to determine the corresponding pixels. The pixels values may be sent to the display blocks 940A and 940B for later displaying processes.

In particular embodiments, the system may use one texture memory to store the texture data which is used by the rendering pipelines of both eyes. In particular embodiments, the two pixel blocks 930A and 930B may processes data for the two eyes in parallel and may have independent states because the two displays may be not synced. Typically, labels and images may be rendered to both eyes, so do the GPU-generated images that are far away enough from a viewer's perspective so that the stereo separation is minimal. Since most label and video image surface data that is needed for one eye is needed for the other eye as well, processing both eyes in the same chip allows that data to be stored once instead of twice. As a result, it is beneficial to use a single texture memory to store the texture data for both eye pipelines. Even for GPU-generated images, separate stereoscopic images may be required only for near objects. If the background is rendered separately, for example, to allow foreground objects to move relative to the background, a stereo background image may not be required in general. In particular embodiments, the system may render an object that requires stereo view using a separate texel array for each eye. In particular embodiments, the system may use a shared texel array for both eye pipelines and each eye pipeline (e.g., pixel block) may access the shared texel array separately since there may be no reliable correlation about where the object may appear in each eye's field of view.

Figure 10:
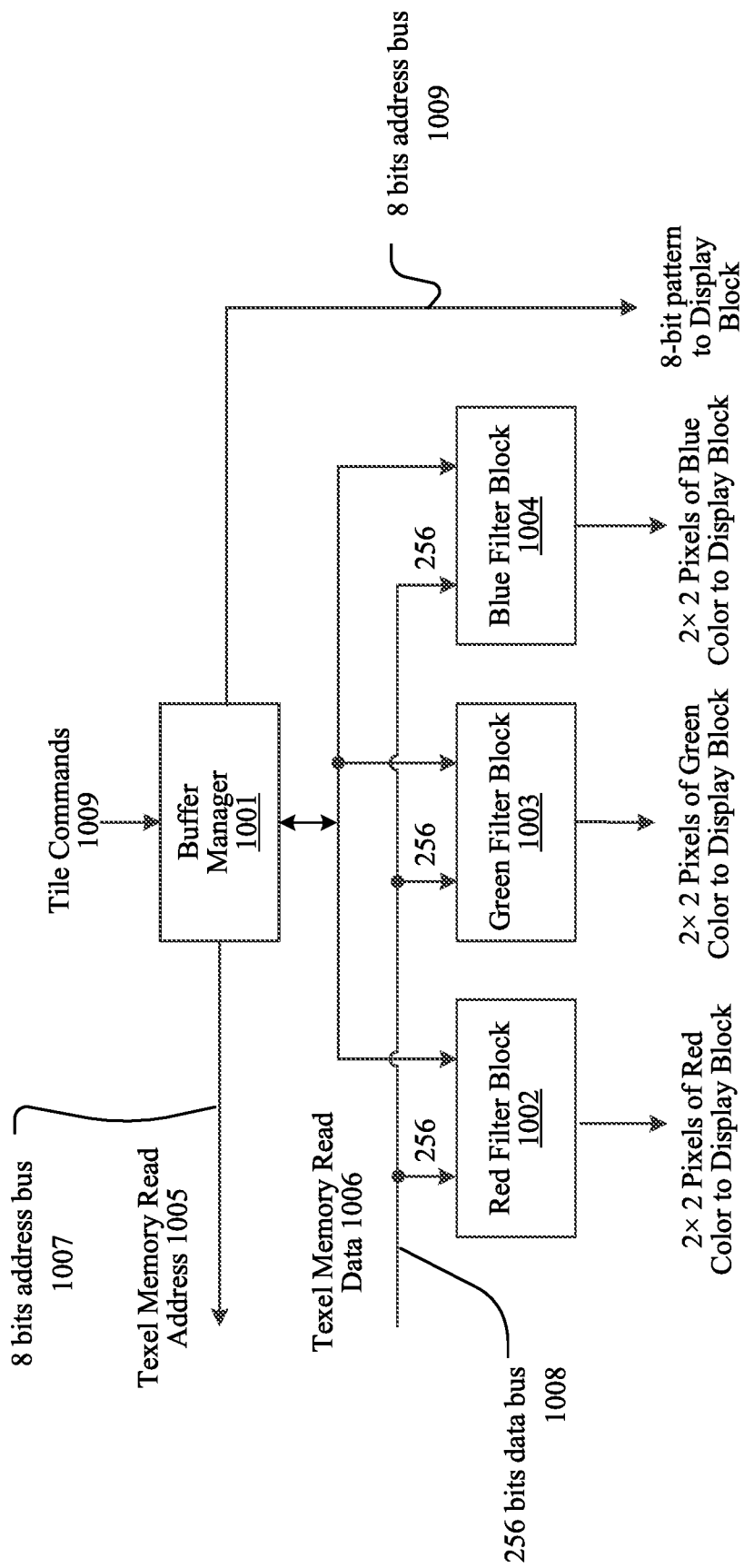
FIG. 10 illustrates an example diagram for pixel block.

FIG. 10 illustrates an example diagram for pixel block 930A. The buffer manager 1001 may receive tile commands 1009 from other modules of the headset system. Before scheduling the samples for interpolation, the buffer manager 1001 may load the necessary surface data into buffers within the filter blocks 1002, 1003, and 1004. The pixel block 930A may receive tile/surface pairs from transform block which may send all the tile/surface pairs at each tile location in the row before moving to another tile. The buffer manager 1001 may schedule bilinear filtering at the pixel positions within the tiles and may perform the bilinear filtering at sample positions based on the schedule. The buffer manager 1001 may send out the texel memory read address 1005 through the 8 bits address bus 1007 to the controller block which includes the texel memory. The pixel block 930A may receive the texel memory read data 1006 through the 256 bits data bus 1008. In particular embodiments, the buffer manager 1001 may load all the required texels data for a tile before processing the samples in that tile/surface pair. In particular embodiments, the buffer manager may allow data to be reused from one tile to the next texel. In particular embodiments, each filter block (e.g., 1001, 1002, 1003) may output a 2×2 pixel array of corresponding color to display block for later displaying process. In particular embodiments, the buffer manager 1009 may output an 8-bit pattern to display block through the 8-bit address bus 1009. In particular embodiments, the system may support foveated rendering and the filter blocks may also write a pattern value per tile that specifies the kind of foveated rendering to use on the tile.

In particular embodiments, the pixel block 930A may process the red, green, and blue color components separately due to chromatic aberration. Chromatic aberration may cause the red, green and blue components of a single display pixel to require different rays, and consequently different sample positions. In particular embodiments, the buffer manager 1001 may compute the bounding boxes of the red, green, and blue tiles and read all texels from texel memory that are needed by any of the three colors. If data retrieved through one texel read operation is needed by more than one color components, the buffer manager 1001 may load the data into multiple color components in parallel. When there is little or no chromatic aberration, the buffer manager 1001 may use one read operation to read from texture memory to load data into all three filter blocks 1002, 1003, and 1004. If the chromatic aberration exceeds 16 pixels, each of the red, green and blue filter blocks may require separate reads from texture memory.

In particular embodiments, the system may use a tile processing order which interleaves tiles from two halves of the tile row. In particular embodiments, edge tiles may likely have high chromatic aberration alternate and center tiles may likely have low chromatic aberration. Depending on chromatic aberration, a single 256-bit texel memory word may be required by one filter block or by multiple filter blocks. In the latter case, a single texel memory read may load the same data into all filter blocks that require the data. Therefore, chromatic aberration may cause up to a three-to-one variance in the read bandwidth that is required to access the texel memory. By using the processing order which interleaves tiles form two halves of the tile row, the system may even out the bandwidth required from the texture memory. For example, a center tile may have little or no chromatic aberration and a single access may be used to load all three filter blocks for a given eye. As another example, an edge tile may have high chromatic aberration and may require separate reads for each of the filter blocks for a given eye. As a result, the system may need no more than four reads in most situations, and therefore reduces the bandwidth that is required to access the texel memory and to keep the pixel blocks busy.

In particular embodiments, the buffer manger 1001 may receive a tile/surface pair for a given position from the transform block. The buffer manager 1001 may compute the 4-texel-aligned conservative bounding box of all three colors and may wait until space is available in all three (double buffered) filter block buffers. The buffer manager 1001 may issue a read for each 4×4 block in the bounding box that is needed by one or more filter blocks and may load the data into a 32×32 texel region within each relevant filter block. When the sampling is finished with a 32×32 texel region, the buffer manager may free the space for further use. In particular embodiments, the texels may be loaded into 32×32 regions in the buffer memory (e.g., quad buffer blocks including texel buffer blocks) or smaller regions to use the buffer more efficiently. For example, the texels may be loaded to regions with any power of two for width and height that is sufficient to store the required texels. In particular embodiments, the buffer manager 1001 may free up texels during sample stepping, after the texels are no longer needed. In particular embodiments, the buffer manager 1001 may discard any tile where one or more of the red, green and blue channels require loading a texel array larger than 32×32 texel array.

Figure 11A:
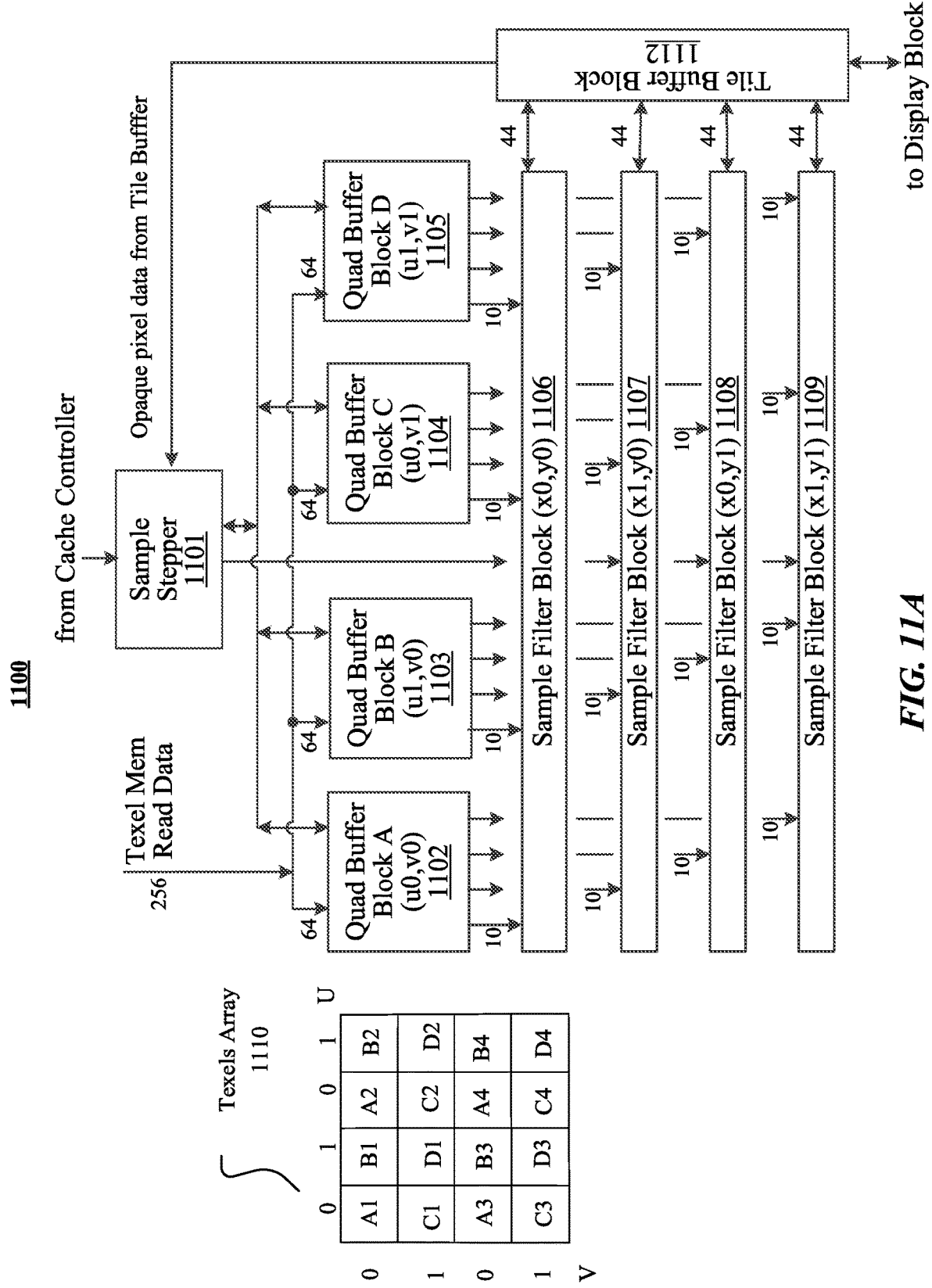
FIG. 11A illustrates an example diagram for filter block including four quad buffer blocks.

FIG. 11A illustrates an example diagram 1100 for filter block. In particular embodiments, a filter block may include a sample stepper 1101, four quad buffer blocks (e.g., 1102, 1103, 1104, 1105), four sample filter blocks (e.g., 1106, 1107, 1108, 1109), a tile buffer block 1112, data buses, etc. In particular embodiments, the filter blocks (e.g., 1002, 1003, 1004 in FIG. 10) may perform bilinear filtering on data stored in a set of internal buffers including the quad buffer blocks (e.g., 1102, 1103, 1104, and 1105). Four groups of texels for four sampling positions may be sampled in parallel in the sample filter blocks 1106, 1107, 1108, and 1109, respectively. The results may be blended with data previously written to those pixel positions by the tile buffer block 1112. Finally, the tile buffer block 1112 may return information (e.g., opaque pixel data) to the sample stepper 1101 to allow optimizing subsequent accesses to the same tile. Texels in texel memory (e.g., 914 in FIG. 9) of the control block may be organized and accessed in 256-bit units so that each quad buffer block may input its own 64-bit sub-word out of the 256-bit texel memory access. Each 16-bits of a 256-bit texel memory read may contain texels for a different position within an aligned 4×4 of texels. Texel memory of the control block may be organized in multiple banks so that a 256-bit access may read an aligned 4×4 block of texels, or half a 4×4 block for 32-bit texels.

In particular embodiments, each quad buffer block may input, through the 64-bit data bus, four 16-bit sub-words that are at the same position in an aligned 2×2 texels region. For example, the quad buffer block 1102 may get the texels (e.g., A1, A2 A3 and A4 in texel array 1110) where the local (U, V) coordinates within corresponding 2×2 texel array are zero (0, 0). Similarly, the quad buffer block 1103 may get the texels (e.g., B1, B2, B3, B4 in texel array 1110) where the local (U, V) coordinates with corresponding 2×2 texel array are (1, 0). The quad buffer block 1104 may get the texels (e.g., C1, C2, C3, C4 in texel array 1110) where the local (U, V) coordinates within corresponding 2×2 texel array are (0, 1). The quad buffer block 1105 may get the texels (e.g., D1, D2, D3, D4 in texel array 1110) where the local (U, V) coordinates within corresponding 2×2 texel array are (1, 1). The 4×4 texels array 1110 may have each texel showing the corresponding the local (U, V) coordinates and each texel may be stored in respective quad buffer blocks as indicated by the letters within the texels (e.g., Ax in quad buffer block 1102, Bx in quad buffer block 1103, Cx in quad buffer block 1104, Dx in quad buffer block 1105). As a result, the four quad buffer blocks 1102, 1103, 1104, and 1105 may provide arbitrarily aligned 2×2 texels for interpolation. For example, the quad buffer blocks 1102, 1103, 1104, and 1105 may each send a texel contained within a 2×2 texel array to each sample filter block (e.g., 1106, 1107, 1108, 1109). Consequently, each sample filter blocks may receive the four texels corresponding a 2×2 texel array and perform interpolation on the texels.

In particular embodiments, the filter block may contain four sample filter blocks (e.g., 1106, 1107, 1108, 1109) each of which may get data input from four quad buffer blocks (e.g., 1102, 1103, 1104, 1105), as well as from the sample stepper 1101. The four sample filter blocks may compute a 2×2 block of sample positions in texture (U, V) space, which correspond to an aligned 2×2 block of integer pixel positions on the display. In particular embodiments, the sample filter blocks may output the results to display blocks through the tile buffer block 1112. In particular embodiments, the sample stepper 1101 may sequence sample positions through the quad buffer blocks and the sample filter blocks. The sample stepper 1101 may send the quad buffer blocks the addresses of texels for read operations and may specify the data format for the data being sent to the sample filter blocks. The sample stepper 1101 may provide filter weights and other control to the sample filter blocks. In particular embodiments, the system may support multiple types of surface data, some of which may require multiple cycles of interpolation operations per pixel in the sample filter blocks.

Figure 11B:
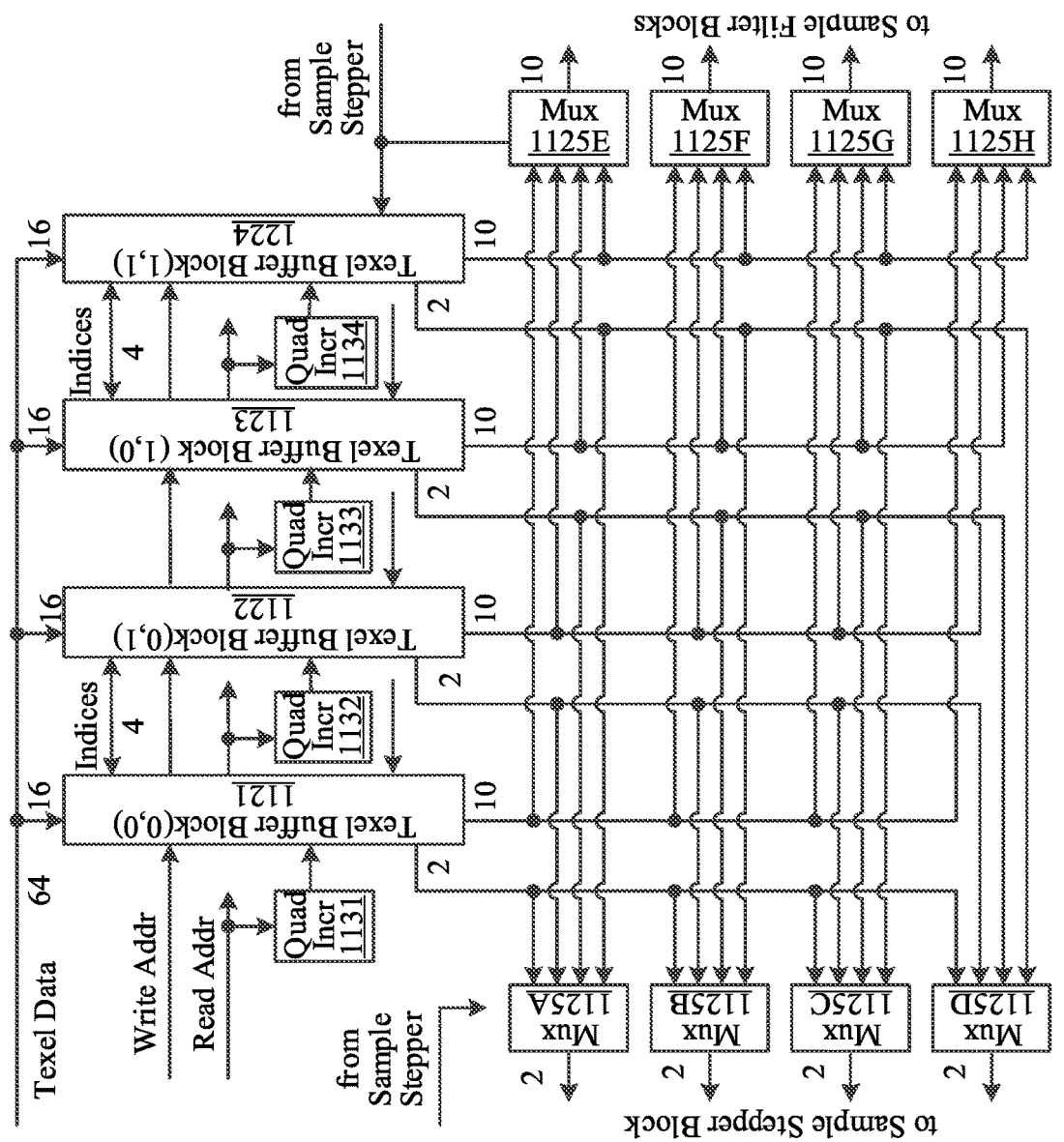
FIG. 11B illustrates an example diagram for quad buffer block including four texel buffer blocks.

FIG. 11B illustrates an example diagram 1110 for quad buffer block (e.g., 1102, 1103, 1104, 1105 in FIG. 11A). In particular embodiments, a quad buffer block may include four texel buffer blocks (e.g., 1121, 1122, 1123, 1124), four quad increment blocks (e.g., 1131, 1132, 1133, 1134), eight multiplexors (e.g., 1125A-H), data bus, address bus, etc. In aggregate, the 16 texel buffer blocks of the four quad buffer blocks may buffer texels for each position in a 4×4 texel array. In particular embodiments, each texel buffer block may store texels that have the same local (U, V) coordinates and are stored in the same quad buffer block. As an example and not by way of limitation, an 4×4 texel array stored in the quad buffer block 1102 may be stored in the corresponding four texel buffer blocks of 1121, 1122, 1123, and 1124 in a pattern as shown in FIG. 11B. The texel buffer block 1121 may store the texels of A1, A3, A9, A11 each of which has the local (U, V) coordinates of (0, 0). The texel buffer block 1122 may store the texels of A2, A4, A10, A12 each of which has the local (U, V) coordinates of (1, 0). The texel buffer block 1123 may store the texels of A5, A7, A13, A15 each of which has the local (U, V) coordinates of (0, 1). The texel buffer block 1124 may store the texels of A6, A8, A14, A16 each of which has the local (U, V) coordinates of (1, 1). As discussed earlier, storing texels in such patterns may allow the 4×4 texel array to have its 16 texels to be stored in 16 separate texel buffer blocks, and therefore to be retrieved from the texel buffer memories in one read operation.

In particular embodiments, texel data may be stored in the texel buffers in wraparound form within each 32×32 texel region. That is, incrementing texel U address from 31 to 32 may wrap around to texel address 0 within a given 32×32 texel block in texel buffers of the filter block. This may allow the (U, V) address of the texel and the offset to the 32×32 texel region to be the same for all of the filter blocks and may require loading only those texels that are required in a filter block's unaligned 32 texel-wide buffer region. In particular embodiments, the display engine may use a more complex algorithm including aligning reads to 2×2 texel boundaries instead of 4×4, using variable size regions in the filter buffers, or re-using texel data from one tile that is also required by an adjacent tile. In particular embodiments, the texel buffer blocks in a specific quad buffer block may buffer texels that have the same low order bit for (U, V) coordinates. For example, texel buffer block 1121 may store texels where bit<1> of the U and V addresses are zero and bit<0> of the U and V addresses are specified by their quad buffer block. The read address for the texel buffer blocks may specify the texel at the start of an arbitrarily aligned 4×4 block of texels. The quad increment blocks (e.g., 1131, 1132, 1133, 1134) may detect cases where bit<1> of the U or V addresses stored in the block is zero but the corresponding read address bit is 1. The remainder of the U or V address may be incremented, wrapping around within a 32×32 texel region. As a result, the texel buffers can address whatever alignment of 4×4 texels covering the texels that are needed by the sample filter blocks.

In particular embodiments, the multiplexors (e.g., 1125E-H) on the right in the quad buffer block diagram 1110 may allow each sample filter block to select which texel buffer block to access so that it can bilinearly interpolate each sample in the corresponding 4×4 texel region. Within a single quad buffer block, each sample filter block may select whether bit<1> of the U and V address should be zero or one. This choice may be made separately within each quad filter block, resulting in each sample filter block getting the 2×2 of texels that it needs. The multiplexor may select bits of the texel data coming from the sample stepper block. The multiplexors (e.g., 1125A-E) on the left in the quad buffer block diagram may perform a different function from the multiplexors on the right, that is, sending information to the sample stepper from the selected texel buffer block. This allows the sample stepper to optimize sample filter sequencing.

Figure 12A:
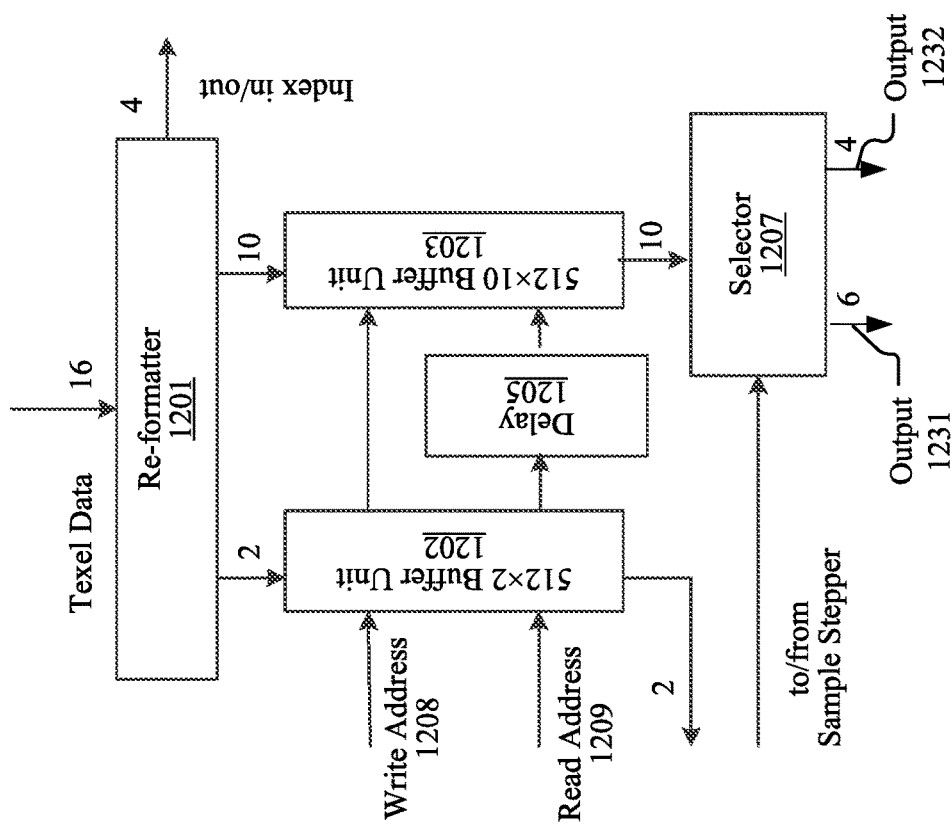
FIG. 12A illustrates an example diagram for texel buffer block.

FIG. 12A illustrates an example diagram 1200 for texel buffer blocks (e.g., 1121, 1122, 1123, 1124 in FIG. 11B). In particular embodiments, a texel buffer block may include a re-formatter block 1201, a 512×2 buffer unit 1202, a 512×10 buffer unit 1203, a delay block 1205, a selector 1207, writing address bus 1208, reading address bus 1209, other data/address buses, etc. The re-formatter block 1201 may convert texel data from formats as stored in the texel memory of the control block to the data formats as required in the texel buffer blocks. A buffer controller may select the writing address, based on which texel data is written into each texel buffer block. The sample stepper block (1101 in FIG. 11A) may select the reading address, which may be customized by the quad buffer block for each texel buffer block. The top two bits of the buffer entry may be firstly read into the 512×2 buffer unit 1202 followed by reading the bottom ten bits into the 512×10 buffer unit 1203 after a fixed delay (e.g., by the day block 1205). The fixed delay may allow the sample stepper to interpret the top two bits and determine the sequence of interpolations that need to be performed. Finally, the selector block 1207 may assemble two six-bit values and may pass a distance, a color, or variable alpha value to the interpolators through a 6-bit output bus 1231. The other output bus 1232 may be used for a label index or a constant that may not be interpolated.

Figure 12B:
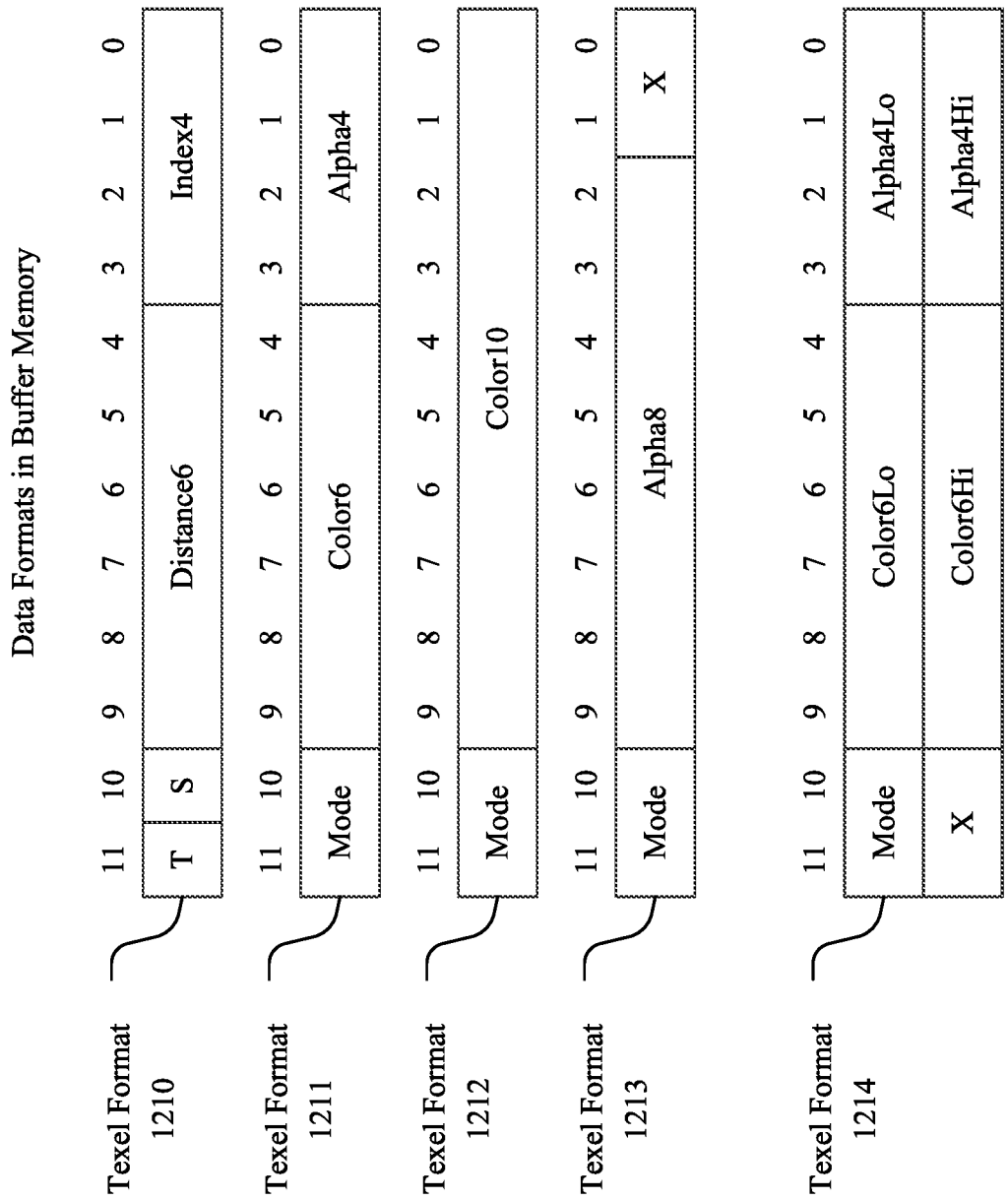
FIG. 12B illustrates example data formats for texel data stored in texel buffer blocks.

FIG. 12B illustrates example texel data formats (e.g., 1210, 1211, 1213, 1214) for texel buffer blocks. In particular embodiments, the texel buffer blocks may support a number of texel data formats for texel buffer entries and storage. Each of the sixteen texel buffer blocks may store information for a single position in a 4×4 texel array. Each texel buffer block may contain buffer units for storing the information required to interpolate one color channel. In particular embodiments, texel data for image surfaces may include a color component and an alpha. Texel data for label surfaces may include a distance component and a color index together with bits to select optimizations. As an example and not by way of limitation, a 12-bit texel format 1210 may include a 1-bit T component, a 1-bit S component, a 6-bit distance component, and a 4-bit index component. As another example, a 12-bit texel format 1211 may include a 2-bit Mode component, a 6-bit color component, and a 4-bit alpha component. As another example, a 12-bit texel format 1211 may include a 2-bit Mode component and a 10-bit color component. As another example, a 12-bit texel format 1213 may include a 2-bit Mode component, a 8-bit alpha component, and a 2-bit X component. As another example, a 24-bit texel format 1214 may include a 2-bit Mode component, a 6-bit low-bit color component, and a 4-bit low-bit alpha component in the low 12 bits and may include a 2-bit X component, a 6-bit high-bit color component, a 4-bit high-bit alpha component in the high 12 bits. In particular embodiments, the T and Mode components/fields may be computed by the re-formatter (1201 in FIG. 12A) and may be used by the sample stepper (1101 in FIG. 11A) to optimize interpolation. In particular embodiments, the image formats may be used based on what kind of surface is being stored. For example, label surfaces may use the 6-bit distance format (i.e., Distance6) with the color index stored in the low order bits. As another example, mask surfaces may use the 8-bit alpha format (i.e., Alpha8). As another example, image surfaces may use one of the other formats depending on the number precision selected for the image surface.

Figure 12C:
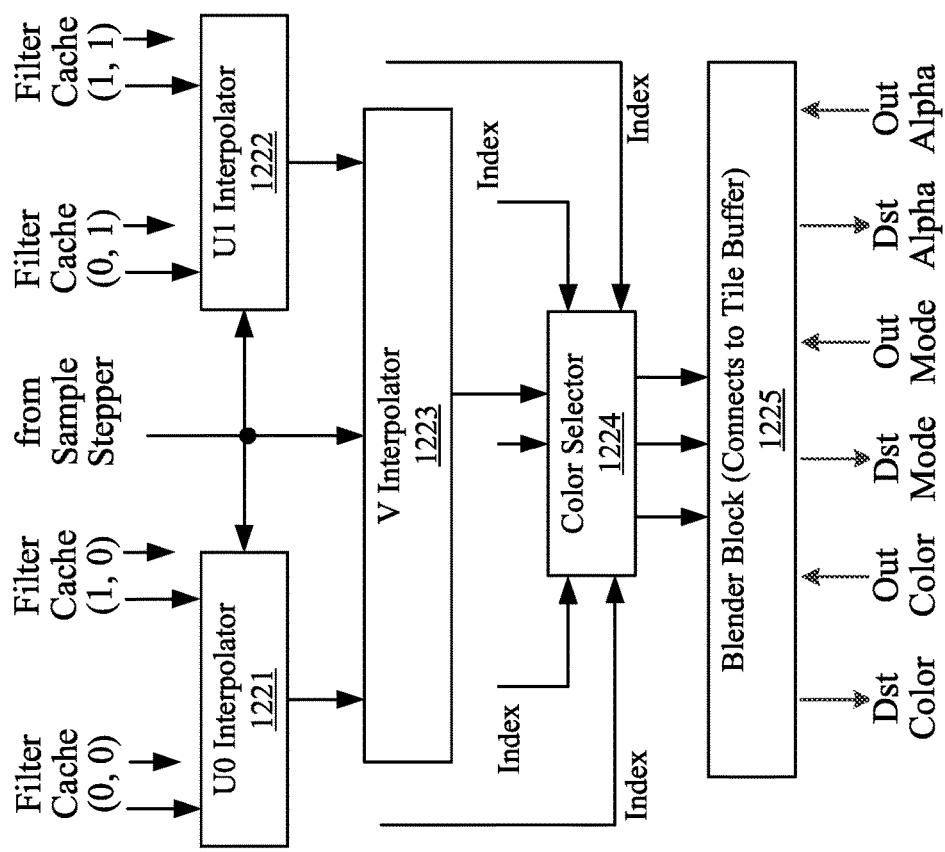
FIG. 12C illustrates an example diagram for sample filter block.

FIG. 12C illustrates an example diagram 1220 for sample filter blocks (e.g., 1106, 1107, 1108, 1109 in FIG. 11A). In particular embodiments, a sample filter block may include a first interpolator 1221, a second interpolator 1222, a V interpolator 1223, a color selector 1224, a blender block 1225, etc. The sample filter block may perform interpolation and post-interpolation processing for a single sampling position. The interpolators 1221 and 1222 may receive from filter cache the texel data corresponding to texel coordinates of (0, 0), (1, 0), (0, 1), and (1, 1). The interpolators 1221, 1222, and 1223 may perform bilinear interpolation with 5×5 multipliers using weights provided by the sample stepper. In particular embodiments, the display engine may perform operation optimization on interpolating short or long data formats (e.g., 6-bit data format, 12-bit data format) and determine how many memory entries and cycles are needed for sending data to interpolators. The output of each interpolator may provide interpolated result with full precision. Rounding or other number conversions may be performed in the color selector block 1224. The interpolators may use 6-bit filter weights that allow magnification to about 32× before artifacts begin appearing. The color selector 1124 may perform two tasks depending whether the surface being filtered is an image or a label. For images, it may route interpolated color and alpha values to the correct outputs. When processing labels, the color selector 1224 may convert a signed distance interpolant into a color. When processing images, the color selector 1224 may separate out color and alpha interpolants. If there is no alpha interpolant, alpha may be either zero or one as selected by control bits from the sample stepper. The blender block 1225 may perform alpha transparency blending when required. The blender block 1225 may combine a source color and source alpha with the destination color and alpha that are accessed through the tile buffer block. Two kinds of blending functions may be performed: add-blend and over-blend, which can be performed either front-to-back back or back-to-front. In other words, blending can treat the source as being either behind or in front of the current value at that pixel position.

Figure 13:
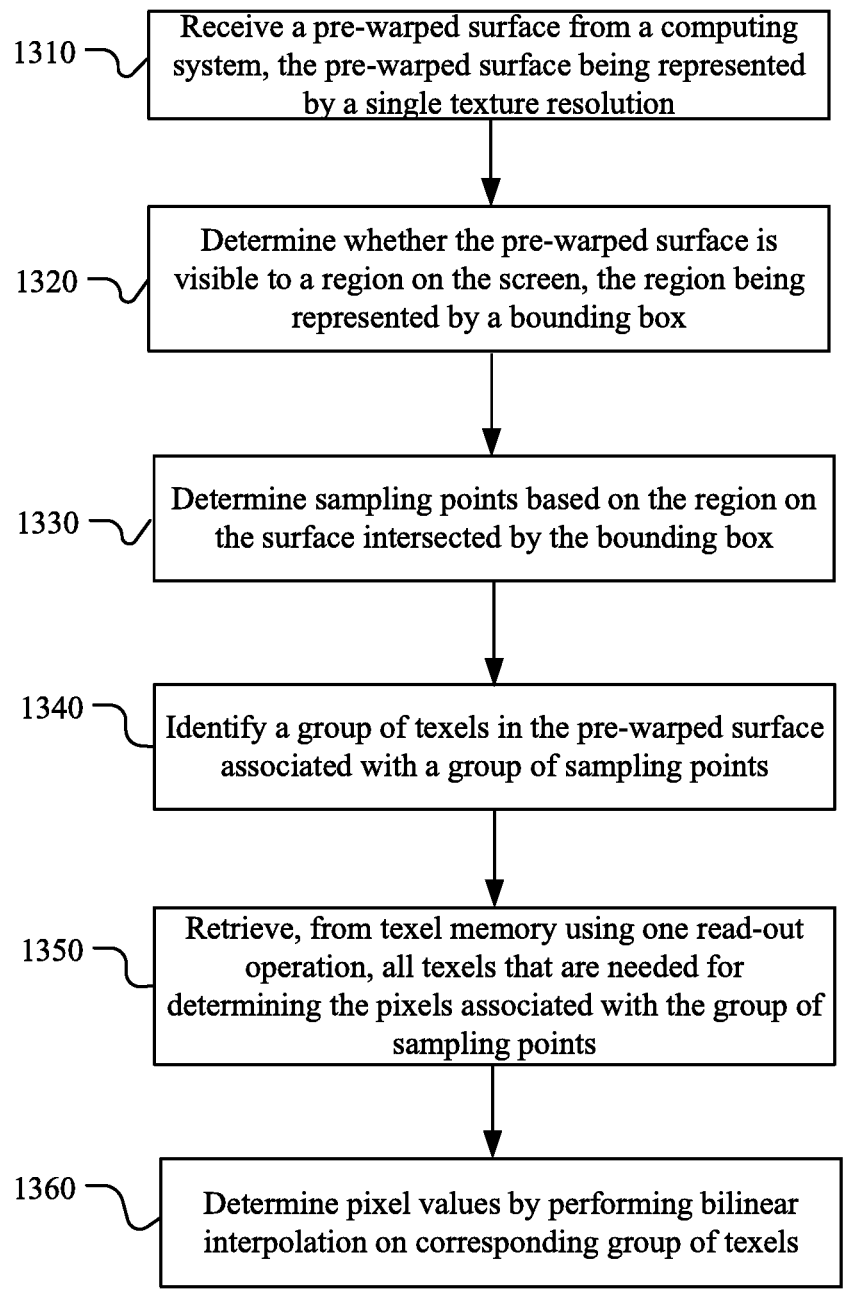
FIG. 13 illustrates an example method of parallelly sampling multiple groups of texels to determine multiple pixel values using bilinear interpolation.

FIG. 13 illustrates an example method 1300 for parallelly sampling multiple groups of texels to determine multiple pixel values using bilinear interpolation. The method 1300 may begin at step 1310, where the headset system may receive pre-warped surfaces from a body wearable computing system. Each pre-warped surface may have texture data that is represented by a single texture resolution. In particular embodiments, the body wearable computing system may include one or more GPUs and smart video decoders. In particular embodiments, the pre-warped surfaces may be generated by the GPUs or the smart video decoders associated with the body wearable computing system. The per-warped surface may be generated based on the rendering results on the GPUs associated with the body wearable computing system and may visually take into account the 3D contour of the underlying object. The pre-warped surface may have position data indicating the location of the surface in a viewer's view space. The pre-warped surface may be represented as a planar region facing the viewer, and as such pixel filtering may be performed using uniform texture resolution all over the surface, even though different portions of the surface may appear to have different depths relative to a viewer.

At step 1320, the headset system may determine whether the pre-warped surface is visible to a region on the screen (e.g., a tile or a collection of pixels, such as 16×16 pixels). In particular embodiments, the system may use a ray casting algorithm to determine whether four casted rays, which define a bounding box, intersect with the pre-warped surface. The rays may be cast based on the current viewpoint of the viewer, and the points of intersection may be used by the display engine on the headset system to further warp the pre-warped surface to accommodate any change in the viewer's viewpoint since the creation of the pre-warped surface. If the bounding box intersects the surface, then the tile corresponding to the bounding box and that surface may be considered as a tile/surface pair (indicating that the surface is visible to the tile). In particular embodiments, the system may generate a number of tile/surface pairs in a similar manner. In particular embodiments, zoom-out operations may be limited to no more than two-times zoom.

At step 1330, the system may determine, based on the region on the surface intersected by the bounding box, sampling points within a texture associated with the surface. For example, if the bounding box corresponds to a tile made up of 16×16 pixels, the system may determine the locations of 16×16 sampling points. In particular embodiments, the system may sequentially perform filtering based on groups of 2×2 sampling points selected from the 16×16 sampling points.

At step 1340, the system may determine, for each group of sampling points, the associated texels that are needed for determining the pixel values at those sampling points. The needed texels may have a predetermined dimension (e.g., 4×4). In particular embodiments, the relative locations of the sampling points and the texel grid may be used to determine which texels are needed. For example, for a group of 2×2 sampling points, the closest 4×4 texels may be selected. In particular embodiments, the system may use a two-time zoom out limitation to ensure that the texels needed for filtering the 2×2 sampling points fall within a 4×4 texel region. This condition may be satisfied as long as the distances of adjacent sampling points are less than or equal to two times the texel size (as indicated by the texel edge length). In particular embodiments, texels may be stored in a texel memory block in a manner that allows 4×4 texels to be accessed with one read operation. For example, the 4×4 texel array may be stored in a 32 Bytes (256 bits) memory block in an interleaved pattern and the content of the 32 Bytes memory block may be retrieved parallelly using one read operation.

At step 1350, the system may retrieve the texels needed for determining the pixel values for the sampling point positions in a single read operation. For example, the system may parallelly retrieve the 4×4 texel array from texel memory using one read-out operation.

At step 1360, the system may determine the pixels values for the sampling points by performing bilinear interpolation (or any other suitable interpolation techniques, such as bicubic interpolation) on the retrieved texels. In particular embodiments, the interpolation process for the four 2×2 sampling points may be performed in parallel by four sample filter blocks.

In particular embodiments, a computing system may receive a number of texels organized into a texel array including a number of sub-arrays. The system may determine a number of texel subsets with the texels in each subset have a same position within their respective sub-arrays. The system may store the texel subsets into a number of buffer blocks, respectively, with each buffer block storing one texel subset of the texel subsets. The system may retrieve a sampling texel array from the buffer blocks for parallelly determining pixel values of a number of sampling points with each texel of the sampling texel array being retrieved from a different buffer block of the buffer blocks. In particular embodiments, the sub-arrays of the texel array may form a repeated pattern within the texel array. In particular embodiments, the buffer blocks may be addressed separately and accessed parallelly.

In particular embodiments, the buffer blocks may be grouped into a number of groups. Each texel used for determining a pixel value of a sampling point may be retrieved from a different group of the texel groups. In particular embodiments, the texel subsets may be determined by: determining a reference texel having a first coordinate (u, v) indicating a position of the reference texel within the texel array, determining a number of intermediate texel groups comprising texels having least significant bits of binary representations of first coordinates (u, v) equal to (0, 0), (1, 0), (0, 1), and (1, 1), respectively, determining a second coordinate (x, y) for each texel of each intermediate texel group, and determining the texel subsets each including texels having least significant bits of binary representations of second coordinates (x, y) equal to (0, 0), (1, 0), (0, 1), and (1, 1) with respect to a corresponding intermediate texel group.

In particular embodiments, the texel subsets may include as least 16 texel subsets and the buffer blocks may include at least 16 buffer blocks. In particular embodiments, each of the sub-arrays may include a 4×4 texel array. Each of the texel subsets may include a 2×2 texel array. Each of the intermediate texel groups may include a 4×4 texel array. In particular embodiments, the 16 texel subsets may be organized into four texel groups and the sampling points may include four sampling points. The four texel groups may be used for parallelly determining the pixels values of the four sampling points, respectively. In particular embodiments, each pixel value may be determined based on a 2×2 texel sub-array of the sampling texel array and each texel of the 2×2 texel sub-array may be selected from one of the four texel groups. In particular embodiments, the pixel values of the sampling points may be determined based on parallel bilinear interpolations on texels of the sampling texel array. Each pixel value of each sampling point may be determined based on a 2×2 texel sub-array of the sampling texel array. In particular embodiments, the sampling points may be associated with an intersection area of a display region to a two-dimensional representation of a portion of a scene. In particular embodiments, the two-dimensional representation may include three-dimensional information of the portion of the scene and the two-dimensional representation of the portion of the scene may be visible in the display region. In particular embodiments, the two-dimensional representation of the portion of the scene may be represented with a single texture resolution. The texel array may include texels having the single texture resolution. In particular embodiments, the sampling texel array may be associated with an aligned texel region or an unaligned texel region.

Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for parallelly sampling multiple groups of texels to determine multiple pixel values using bilinear interpolation including the particular steps of the method of FIG. 13, this disclosure contemplates any suitable method for parallelly sampling multiple groups of texels to determine multiple pixel values using bilinear interpolation including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Figure 14:
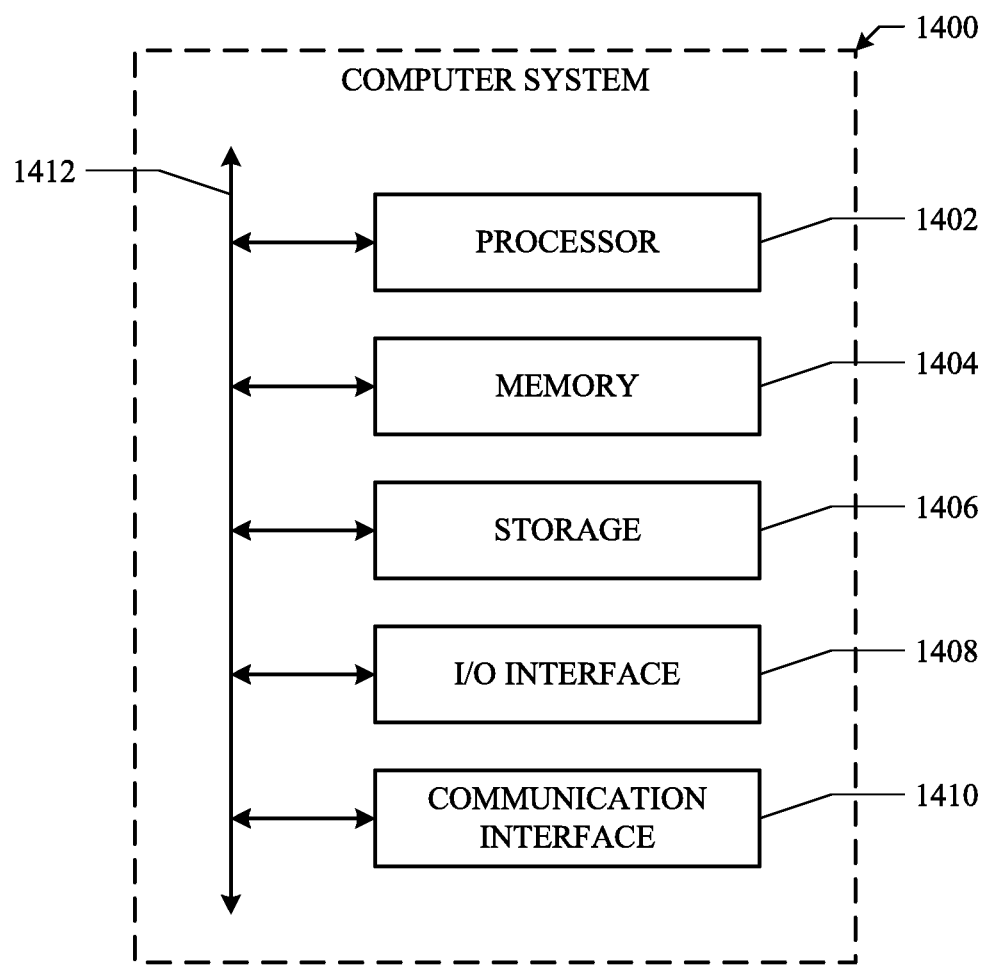
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving a plurality of texels organized into a texel array comprising a plurality of N×N sub-arrays, wherein each texel of the plurality of texels falls within a corresponding N×N sub-array and is associated with a two-dimensional sub-array coordinate indicating a position of that texel within the corresponding N×N sub-array;
   determining a plurality of texel subsets, wherein the two-dimensional sub-array coordinates associated with the texels in each texel subset are the same;
   storing the plurality of texel subsets into a plurality of buffer blocks, respectively, wherein each buffer block stores one texel subset of the plurality of texel subsets;
   reading from the plurality of buffer blocks in parallel to retrieve a sampling texel array, wherein each texel of the sampling texel array is retrieved from a different buffer block of the plurality of buffer blocks; and
   extracting a plurality of M×M texel sub-arrays from the sampling texel array for parallelly determining a plurality of pixel values, wherein each pixel value of the plurality of pixel values is determined based on an M×M texel sub-array of the plurality of M×M texel sub-arrays, and wherein M is smaller than N.

2. The method of claim 1, wherein the plurality of N×N sub-arrays forms a repeated pattern within the texel array.

3. The method of claim 1, wherein each of the plurality of buffer blocks is accessed parallelly with respect to other buffer blocks of the plurality of buffer blocks.

4. The method of claim 1, wherein the plurality of buffer blocks is grouped into a plurality of groups, and wherein each texel used for determining a pixel value of a sampling point is retrieved from a different group of the plurality of groups.

5. The method of claim 1, wherein the plurality of texel subsets is determined by:
   determining a reference texel having a first coordinate (u, v) indicating a position of the reference texel within the texel array;
   determining a plurality of intermediate texel subsets comprising texels having least significant bits of binary representations of first coordinates (u, v) equal to (0, 0), (1, 0), (0, 1), and (1, 1), respectively;
   determining a second coordinate (x, y) for each texel of each intermediate texel subset; and
   determining the plurality of texel subsets each comprising texels having least significant bits of binary representations of second coordinates (x, y) equal to (0, 0), (1, 0), (0, 1), and (1, 1) with respect to a corresponding intermediate texel subset.

6. The method of claim 5, wherein the plurality of texel subsets comprises 16 texel subsets, and wherein the plurality of buffer blocks comprises 16 buffer blocks.

7. The method of claim 6, wherein the 16 texel subsets are stored into the 16 buffer blocks with each buffer block storing one texel subset of the 16 texel subsets.

8. The method of claim 7, wherein each texel sub-array of the M×M texel sub-arrays is a 2×2 texel sub-array, and wherein each texel of the 2×2 texel sub-array is retrieved from a different buffer block of the 16 buffer blocks.

9. The method of claim 1, wherein the plurality of pixel values are associated with a plurality of sampling points, and wherein the plurality of sampling points corresponds to corners of an intersection area of a display region to a two-dimensional representation of a portion of a scene.

10. The method of claim 9, wherein the two-dimensional representation comprises three-dimensional information of the portion of the scene, and wherein the two-dimensional representation of the portion of the scene is visible in the display region.

11. The method of claim 9, wherein the two-dimensional representation of the portion of the scene is represented with a single texture resolution, and wherein the texel array comprises texels having the single texture resolution.

12. The method of claim 1, wherein the sampling texel array is associated with an aligned texel region or an unaligned texel region.

13. One or more computer-readable non-transitory storage media embodying software that is operable when executed to:
   receive a plurality of texels organized into a texel array comprising a plurality of N×N sub-arrays, wherein each texel of the plurality of texels falls within a corresponding N×N sub-array and is associated with a two-dimensional sub-array coordinate indicating a position of that texel within the corresponding N×N sub-array;
   determine a plurality of texel subsets, wherein the two-dimensional sub-array coordinates associated with the texels in each texel subset are the same;
   store the plurality of texel subsets into a plurality of buffer blocks, respectively, wherein each buffer block stores one texel subset of the plurality of texel subsets;
   read from the plurality of buffer blocks in parallel to retrieve a sampling texel array, wherein each texel of the sampling texel array is retrieved from a different buffer block of the plurality of buffer blocks; and
   extract a plurality of M×M texel sub-arrays from the sampling texel array for parallelly determining a plurality of pixel values, wherein each pixel value of the plurality of pixel values is determined based on an M×M texel sub-array of the plurality of M×M texel sub-arrays, and wherein M is smaller than N.

14. The media of claim 13, wherein the plurality of N×N sub-arrays forms a repeated pattern within the texel array.

15. The media of claim 13, wherein each of the plurality of buffer blocks accessed parallelly with respect to other buffer blocks of the plurality of buffer blocks.

16. The media of claim 13, wherein the plurality of buffer blocks is grouped into a plurality of groups, and wherein each texel used for determining a pixel value of a sampling point is retrieved from a different group of the plurality of groups.

17. A system comprising:
one or more processors; and
one or more computer-readable non-transitory storage media coupled to one or more of the processors and comprising instructions operable when executed by one or more of the processors to cause the system to:
receive a plurality of texels organized into a texel array comprising a plurality of N×N sub-arrays, wherein each texel of the plurality of texels falls within a corresponding N×N sub-array and is associated with a two-dimensional sub-array coordinate indicating a position of that texel within the corresponding N×N sub-array;
determine a plurality of texel subsets, wherein the two-dimensional sub-array coordinates associated with the texels in each texel subset are the same;
store the plurality of texel subsets into a plurality of buffer blocks, respectively, wherein each buffer block stores one texel subset of the plurality of texel subsets;
read from the plurality of buffer blocks in parallel to retrieve a sampling texel array, wherein each texel of the sampling texel array is retrieved from a different buffer block of the plurality of buffer blocks; and
extract a plurality of M×M texel sub-arrays from the sampling texel array for parallelly determining a plurality of pixel values, wherein each pixel value of the plurality of pixel values is determined based on an M×M texel sub-array of the plurality of M×M texel sub-arrays, and wherein M is smaller than N.

18. The system of claim 17, wherein the plurality of N×N sub-arrays forms a repeated pattern within the texel array.

19. The system of claim 17, wherein each of the plurality of buffer blocks is accessed parallelly with respect to other buffer blocks of the plurality of buffer blocks.

20. The system of claim 17, wherein the plurality of buffer blocks is grouped into a plurality of groups, and wherein each texel used for determining a pixel value of a sampling point is retrieved from a different group of the plurality of groups.

* * * * *